US011307333B2

(12) United States Patent
Emmons et al.

(10) Patent No.: US 11,307,333 B2
(45) Date of Patent: Apr. 19, 2022

(54) ASYMMETRIC TURNING FILM WITH TOP-HAT LIGHT OUTPUT DISTRIBUTIONS

(71) Applicant: 3M INNOVATIVE PROPERTIES COMPANY, St. Paul, MN (US)

(72) Inventors: Robert M. Emmons, St. Paul, MN (US); Kenneth A. Epstein, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 201 days.

(21) Appl. No.: 16/475,186

(22) PCT Filed: Jan. 3, 2018

(86) PCT No.: PCT/US2018/012175
§ 371 (c)(1),
(2) Date: Jul. 1, 2019

(87) PCT Pub. No.: WO2018/129034
PCT Pub. Date: Jul. 12, 2018

(65) Prior Publication Data
US 2019/0339427 A1    Nov. 7, 2019

Related U.S. Application Data

(60) Provisional application No. 62/442,338, filed on Jan. 4, 2017.

(51) Int. Cl.
*G02B 5/04* (2006.01)
*F21V 5/02* (2006.01)
(Continued)

(52) U.S. Cl.
CPC ........... *G02B 5/045* (2013.01); *F21V 5/02* (2013.01); *G02B 5/0278* (2013.01); *G02B 6/0053* (2013.01)

(58) Field of Classification Search
CPC .... G02B 5/045; G02B 5/0278; G02B 6/0053; F21V 5/02
See application file for complete search history.

(56) References Cited

U.S. PATENT DOCUMENTS 5,528,720 A * 6/1996 Winston .............. G09F 13/0409
385/146
6,002,829 A * 12/1999 Winston .............. G02B 6/0053
385/146
(Continued)

FOREIGN PATENT DOCUMENTS

CN        104696876      10/2015
JP        2007-234430 A   9/2007
(Continued)

OTHER PUBLICATIONS

International Search Report for PCT International Application No. PCT/US2018/012175, dated Apr. 11, 2018, 7 pages.

*Primary Examiner* — Fatima N Farokhrooz
(74) *Attorney, Agent, or Firm* — Jonathan L. Tolstedt

(57) ABSTRACT

An optical system including a light guide and a turning film that includes a first major surface, where the first major surface is substantially smooth and a second major surface including a plurality of asymmetric microstructures each respective asymmetric microstructure including a first side, where the first side is substantially planar, and a second side including a first surface segment defining a substantially planar surface and a second surface segment defining a non-planar surface.

23 Claims, 20 Drawing Sheets

(51) Int. Cl.
*G02B 5/02* (2006.01)
*F21V 8/00* (2006.01)

(56) References Cited

U.S. PATENT DOCUMENTS

| | | | | |
|---|---|---|---|---|
| 6,746,130 B2* | 6/2004 | Ohkawa | ............... | G02B 6/0031 349/62 |
| 2003/0035231 A1 | 2/2003 | Epstein | | |
| 2004/0109663 A1* | 6/2004 | Olczak | ................. | G02B 6/0046 385/146 |
| 2005/0094295 A1 | 5/2005 | Yamashita | | |
| 2006/0152827 A1* | 7/2006 | Yamashita | ........... | G02B 6/0038 359/838 |
| 2007/0053206 A1 | 3/2007 | Yamashita | | |
| 2007/0126329 A1* | 6/2007 | Chuang | ................. | G02B 5/045 313/110 |
| 2007/0222916 A1* | 9/2007 | Kohara | ................. | G02B 5/045 349/65 |
| 2008/0055926 A1* | 3/2008 | Yamashita | ........... | G02B 5/0242 362/606 |
| 2008/0144336 A1 | 6/2008 | Yamashita | | |
| 2009/0219723 A1* | 9/2009 | Liou | .................... | G02B 6/0053 362/340 |
| 2010/0053502 A1 | 3/2010 | Kim | | |
| 2011/0149391 A1* | 6/2011 | Brott | ....................... | G02B 30/29 359/463 |
| 2013/0258709 A1 | 10/2013 | Thompson | | |
| 2014/0286044 A1* | 9/2014 | Johnson | ................. | G02B 5/021 362/607 |
| 2015/0029442 A1* | 1/2015 | Koike | ................... | G02F 1/1336 349/65 |
| 2016/0054508 A1* | 2/2016 | Hirayama | ........... | G02B 6/0055 349/65 |

FOREIGN PATENT DOCUMENTS

| | | | |
|---|---|---|---|
| TW | I258023 | * | 7/2006 |
| WO | WO 2018-129068 | | 7/2018 |
| WO | WO 2018-129073 | | 7/2018 |

* cited by examiner

ASYMMETRIC TURNING FILM WITH TOP-HAT LIGHT OUTPUT DISTRIBUTIONS

BACKGROUND

Turning films may be used in display and lighting applications to change the angular distribution of light from an optical display. Turning films generally have features which operate by refracting and/or reflecting light. Turning films may be used in conjunction with light sources to provide a desired light output.

SUMMARY

The described asymmetric turning films (ATFs) may be used to control the angular distribution of light to provide a top-hat shaped light output distribution with light distribution cut-off angles and a flat-top region without absorbing a significant amount of light.

In some examples, the disclosure describes an optical system including a light guide and a turning film that includes a first major surface, where the first major surface is substantially smooth and a second major surface including a plurality of asymmetric microstructures each respective asymmetric microstructure including a first side, where the first side is substantially planar, and a second side including a first surface segment defining a substantially planar surface and a second surface segment defining a non-planar surface.

In some examples, the disclosure describes an optical system, including a light guide and a turning film, including a first major surface defining a reference plane parallel to the first major surface, where the first major surface is substantially smooth, and a second major surface, including a plurality of asymmetric microstructures each respective asymmetric microstructure, including a first side, where the first side is substantially planar, and a second side, including a first surface segment defining a substantially planar surface, where a first angle of the first surface segment relative to the reference plane is between about 40 degrees and about 70 degrees relative to the reference plane, wherein the first angle is based on a first linear equation, and a second surface segment defining a non-planar surface, where the shape of the second surface segment is based on a cubic equation or higher order equation, where a first derivative of the cubic equation or higher order equation matches the first linear equation, a third surface segment defining a substantially planar surface, where a second angle of the third surface segment is between about 40 degrees and about 70 degrees relative to the reference plane, where the second angle is based on a second linear equation, and where a first derivative of the cubic equation or higher order equation matches the second linear equation.

In some examples, the disclosure describes an optical system, including a light guide having a first substantially collimated light input distribution and a turning film, including a first major surface defining a reference plane parallel to the first major surface, where the first major surface is substantially smooth, and a second major surface, including a plurality of asymmetric microstructures each respective asymmetric microstructure, including a first side, where the first side is substantially planar, and a second side, including a first surface segment defining a substantially planar surface, where a first angle of the first surface segment relative to the reference plane is between about 40 degrees and about 70 degrees relative to the reference plane, where the first angle is based on a first linear equation, and a second surface segment defining a non-planar surface, where the shape of the second surface segment is based on a cubic equation or higher order equation, where the cubic equation or higher order equation is based on the light input distribution, where a first derivative of the cubic equation or higher order equation matches the first linear equation, a third surface segment defining a substantially planar surface, where a second angle of the third surface segment is between about 40 degrees and about 70 degrees relative to the reference plane, where the second angle is based on a second linear equation, where a first derivative of the cubic equation or higher order equation matches the second linear equation, where at least 60 percent of light originating from the light guide and exiting through the first major surface is included in a first set of characteristic viewing angles, where the first major surface defines a center viewing angle normal to the first major surface, where the first set of characteristic viewing angles is between about −35 degrees and about 35 degrees relative to the center viewing angle.

In some examples, the disclosure describes an optical system, including a light guide having a first light input distribution and a turning film, including a first major surface, defining a reference plane parallel to the first major surface, where the first major surface is substantially smooth, and a second major surface comprising a plurality of asymmetric microstructures each respective asymmetric microstructure, including a first side and a second side, including a first surface segment defining a substantially planar surface, where a first angle of the first surface segment relative to the reference plane is configured to provide a first light distribution cut-off near a first viewing angle, a second surface segment defining a non-planar surface, where the second surface segment is configured to provide a substantially similar relative brightness from the first viewing angle to a second viewing angle based on the first light distribution, and a third surface segment defining a substantially planar surface, where a second angle of the third surface segment is configured to provide a second light distribution cut-off near the second viewing angle.

In some examples, the disclosure describes a vehicle display system, including a vehicle, a vehicle display in the vehicle, the vehicle display including an optical system, including a light guide and a turning film, including a first major surface, where the first major surface is substantially smooth, and a second major surface including a plurality of asymmetric microstructures each respective asymmetric microstructure, including a first side, where the first side is substantially planar, and a second side, including a first surface segment defining a substantially planar surface and a second surface segment defining a non-planar surface.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes asymmetric turning films (ATFs) and optical systems that include the same. In some display applications, it may be desirable for an optical system to provide an output distribution with sharp brightness roll-off at the edges and a flat-top (i.e., a top-hat shaped distribution) without decreasing the efficiency of the backlight. For example, in automotive displays a top-hat distribution may provide for a display with near uniform brightness over a range of viewing angles in the vertical direction with a sharp cut-off to reduce glare from the display off the windscreen during low ambient light conditions.

Turning film backlights may be used to create collimated output light distributions, and the turning film prism facet angles and prism tilt may be used to control the center of the light distribution. The described ATFs with a planar and non-planar face may be used to provide useful or desirable light output distributions including, for example, a top-hat distribution. For example, optical systems with the described ATFs may be used to control the vertical angular distribution of light from a display without decreasing efficiency and without a broad brightness roll-off, as compared to optical systems without such ATFs. In some examples, the described ATFs may include at least one planar segment adjacent a curved segment to provide a top-hat distribution without absorbing a significant amount light. In some examples, the planar segment may provide a light output distribution with a sharp edge at a desired viewing angle. In some examples, the curved segment may provide for a light output distribution with a flat-top. In some examples, the shape of the curved segment may be based on a cubic equation (or higher order equation). In some examples, the shape of the curved segment may be based on the light input distribution of light input into the ATF. In some examples, the described ATFs may be used alone or in conjunction with louver films, angular contrast controlled LCDs, or the like to improve efficiency and reduce unwanted stray light.

Figure 1:
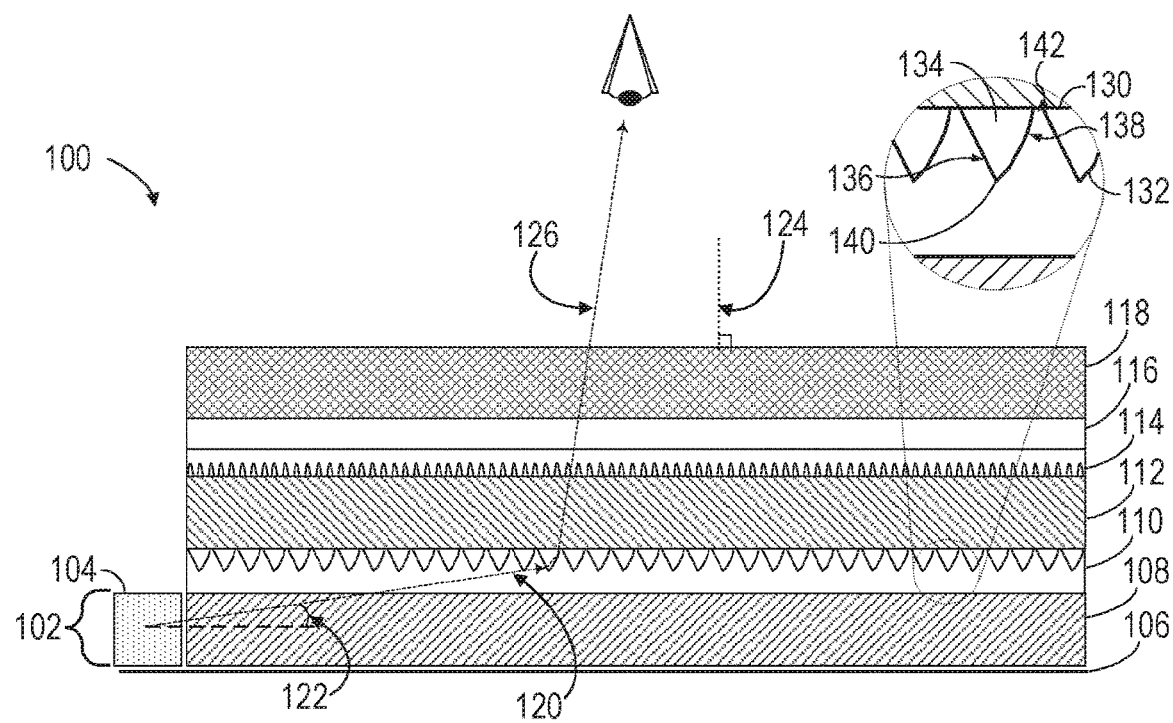
FIG. 1 is a conceptual and schematic side elevation cross-section of an example optical system that includes an ATF with planar and non-planar facets.

FIG. 1 is a conceptual and schematic side elevation cross-section of an example optical system 100 that includes an asymmetric turning film (ATF) 110 with planar and non-planar facets. In the example of FIG. 1, optical system 100 may include light guide assembly 102 including light source 104, back-reflector 106, and light guide 108; ATF 110; substrate 112, spreader 114, optical adhesive 116, and liquid crystal display 118. In some examples, optical system 102 may include light guide 108 and ATF 110.

In some examples, ATF 110 may be configured to receive substantially collimated light from light guide 108 (e.g., light beam 120 collimated at angle 122) and output light collimated in a plane substantially parallel to display axis 124 (e.g., light beam 126). For example, ATF 110 may receive the collimated light output from a turning film type lightguide, or a wedge or pseudo-wedge lightguide, or the like.

In some examples, light guide assembly 102 may include one or more of any suitable light source 104 or combinations of light sources (not shown). In some examples, light source 104 may include one or more light emitting diodes (LEDs). In some examples, light source 104 may each include a singular light source or may include a plurality of light sources (e.g., a bank or series of light sources). In some examples, light source 104 may include cold cathode fluorescent lights (CCFLs) or incandescent light sources. Light source 104 and any corresponding injection, collimation, or other optics may be selected to provide any suitable wavelength or combination of wavelengths, polarizations, point spread distributions, and degrees of collimation.

In some examples, light guide assembly 102 may include lightguide 108. In some examples, light guide assembly 102 may be configured to output substantially collimated light, e.g., substantially collimated light output may include a light output having a full-width half maximum (FWHM) of less than 40 degrees. For example, light guide assembly 102 may include lightguide 108 that may include a turning film lightguide including a wedge lightguide to extract light by gradual frustration of total internal reflection such that light is output from light guide assembly 102 along display axis 124 in the down-guide direction at high angles. Zero degrees down-guide angle can be defined along the display axis. Positive down-guide angles can rotate increasingly away from the light source where negative down-guide angles can rotate increasingly towards the light source. As another example, light guide assembly 102 may include lightguide 108 that may include a pseudo-wedge including a flat lightguide having shallow sloped extractor shapes to weakly frustrate total internal reflection such that the extracted light is collimated at high angles from light guide assembly 102 substantially parallel display axis 124 in the down-guide direction. In such examples, the density and area fraction of such extractors (i.e., surface area of extractors to total surface area of the backlight light guide) is arranged to uniformly emit light and substantially extract light from lightguide 108 along its length (e.g., to extract 80% of light from lightguide 108, or 90% of light from lightguide 108, or 95% of light from lightguide 108). Additionally, in such examples, light guide assembly 102 may include lenticular and/or prismatic grooves or structures on one side along the light propagation direction to scatter the propagating light, break up source image artifacts, or collimate the light in the cross-guide direction (i.e., the light may be collimated in both the down-guide and cross-guide directions).

In some examples, light guide assembly 102 may include back-reflector 106. In some examples, back-reflector 106 may recycle light from lightguide 108. For example, back-reflector 106 may include a reflector, a reflective polarizer, or the like. In some examples, back-reflector 106 may include optical scattering distributions such as, for example, diffuse, near-specular, or specular. In some examples, back-reflector 106 may include one film layer. In some examples, back-reflector 106 may include coated metalized films. In other examples, back-reflector 106 may include more than one film layer, such as, for example, enhanced specular reflector films.

In some examples, ATF 110 may include substantially smooth surface 130 (i.e., a first major surface) and structured surface 132 (i.e., a second major surface). In some examples, substantially smooth surface 130 may define display axis 124 extending substantially perpendicular to substantially smooth surface 130. In some examples, structured surface 132 may include a plurality of microstructures 134 each having first side 136 and second side 138 that intersect at vertex 140. In some examples, vertex 140 may include some rounding, e.g., less than 5% of the period, or less than 2% of the period. In some examples, adjacent microstructures 134 may define valley 142. In some examples, ATF 110 may be optically coupled to lightguide 108. In some examples, ATF 110 may be directly adjacent lightguide 108. In other examples, an additional layer may be disposed between lightguide 108 and ATF 110, for example, an additional layer may include an optical adhesive or another substrate. In some examples, ATF 110 may output light substantially collimated in a first plane.

In some examples, substantially smooth surface 130 may not be completely smooth, e.g., substantially smooth surface 130 may by substantially smooth surface when the surface does not contain microstructures. For example, an anti-wetout or anti-glare beaded coating may be included or incorporated on the surface of substantially smooth surface 130, and such a surface may still be considered substantially smooth. In other words, the term substantially smooth is not used to indicate that the surface is perfectly planar, but instead to indicate that the surface is non-structured.

In some examples, structured surface 132 may include microstructures 134. In some examples, microstructures 134 may include asymmetric microstructures. In some examples, microstructures 134 may include asymmetric prismatic microstructures. In some examples, microstructures 134 may have substantially the same lateral cross-sectional shape. In other examples, structured surface 132 may include more than one type of prismatic microstructures 134, e.g., an angular microstructure and/or multifaceted microstructure. In some examples, each of microstructures 134 may be linear microstructures, i.e., microstructures 134 may extend along a plane perpendicular to display axis 124 with substantially the same (e.g., the same or nearly the same) cross-sectional shape (e.g., as shown in the cross-sectional view of FIG. 1, and extending in an axis into/out of the page).

In some examples, each of microstructures 134 may have a first side 136. In some examples, first side 136 may be a single, straight facet. In other examples, first side 136 may be multifaceted. In other examples, first side 136 may be curved or arcuate to form a suitable light output distribution from the collimated input distribution. In some examples, light existing lightguide 108 may be incident on first side 136 of microstructures 134 of ATF 110, e.g., light beam 120 may be incident on first side 136.

In some examples, each of microstructures 134 may have second side 138. In some examples, second side 138 may be curved or arcuate to form a suitable light output distribution from the collimated input distribution. In some examples, the second surface segment may be substantially convex. In other examples, the second surface segment may be substantially concave. In some examples, second side 138 may include a non-optically relevant segment than can be linear, concaved, convex, some combination thereof, or the like. In some examples, light existing lightguide 108 may be incident on first side 136 of microstructures 134 of ATF 110, e.g., light beam 120 may be incident on first side 136. The overall arrangement of microstructures 134 on structured surface 132 may have any suitable pitch and may or may not have land (i.e., flat areas) between adjacent microstructures. In some examples, microstructures 134 may be directly adjacent to one another such that a microstructure creates a shadowing effect on an adjacent microstructure. In some examples, the shape of the portion of microstructure 134 shadowed by an adjacent microstructure may not affect the light distribution of the ATF.

Microstructures 134 may be any appropriate size. In some examples, microstructures 134 may be on the millimeter or micrometer scale, e.g., pitch of microstructures 134 between about 10 and about 200 micrometers or between about 10 and about 100 micrometers. The pitch or size of asymmetric microstructures 134 may increase, decrease, both increase and decrease, or remain constant for all or portions of structured surface 132 of ATF 110. In some examples, microstructures 134 may all be substantially the same (e.g., the same or nearly the same) or may include a combination of microstructures that are different shapes or sizes. In some examples, ATF prism pitch may affect visual appearance of optical system 100, reduce Moiré effects of optical system 100, reduce diffraction effects of optical system 100, or the like.

ATF 110 may be any suitable thickness and may be made from any suitable material. In some examples, ATF 110 may be formed from a polymeric material, such as polycarbonate, polyethylene terephthalate, polyethylene naphthalate, poly (methyl methacrylate) and copolymers and blends of the same. Other appropriate materials include acrylics, polystyrenes, methyl styrenes, acrylates, polypropylenes, polyvinyl chlorides, and the like. In some examples, ATF 110 may be optically transparent or have low haze and high clarity to avoid undesirably scattering incident light. In some examples, ATF 110 may have a sufficiently high index of refraction, such as between about 1.45 and about 1.75 or between about 1.5 and about 1.75, to facilitate total internal reflection at a sufficiently broad range of angles. In some examples the material, dimensions, or both of ATF 110 may be selected to produce a flexible film.

Microstructures 134, and more generally, the structured surface 132 may be formed through any suitable process, such as a microreplication process. For example, structured surface 132 may be formed through cutting (fly cutting, thread cutting, diamond turning, or the like), or pressing a compliant but curable or hardenable material against a suitable tool with a surface defining the negative of the desired structure. The material may be subsequently hardened or cured (for example, through exposure to light such as ultraviolet light), leaving structured surface 132 with the desired microstructures 134. Other processes for forming ATF 110 may also be possible including, for example, casting and curing with an electroplated, laser cut, or etched tool, using photolithography such as two-photon mastering of a tool in conjunction with a cast and cure process, or even direct machining or an additive three-dimensional printing process.

In some examples, ATF 110 may be optically coupled to substrate 112. In some examples, ATF 110 may be formed on substrate 112, i.e., microstructures 134 may be formed on substrate 112. In some examples, substrate 112 may be two separate substrates.

In some examples, substrate 112 may be optically coupled to spreader 114. In some examples, spreader 114 may be configured to spread collimated light from ATF 110 in the cross-guide direction (i.e., in/out of the page). For example, spreader 114 may include catadioptric spreader microstructures. As another example, spreader 114 may include orthogonal hybrid lenticular spreader microstructures. In some examples, spreader 114 may not substantially effect down-guide (i.e., left/right on the page) angular luminance distribution. In some examples, spreader 114 may be formed on substrate 112, i.e., spreader 114 microstructures may be formed on substrate 112. In some examples, optical system 100 may not include spreader 114.

In some examples, optical system 100 may not include substrate 112, e.g., ATF 110 may be directly adjacent spreader 114. In some examples, substrate 112 may be an optical adhesive, polyethylene terephthalate, polycarbonate, or the like. In some examples, ATF 110 and spreader 114 may be disposed on opposite sides of substrate 112. In other examples, ATF 110 and spreader 114 may be disposed on two separate substrates, where the two substrates are laminated together or otherwise optically coupled.

In some examples, liquid crystal display (LCD) 118 may be disposed adjacent spreader 114. In some examples, LCD 118 may be disposed directly adjacent spreader 114. In other examples, LCD 118 may not be disposed directly adjacent spreader 114.

In some examples, optical adhesive 116 may bond spreader 114 to LCD 118. In some examples, optical adhesive 116 may partially or fully fill the voids between adjacent spreader microstructures of spreader 114. In some examples, other layers may be disposed between LCD 118 and spreader 114, e.g., a substrate or a film may be disposed between LCD 118 and spreader 114.

In some examples, optical system 100 may be mounted in a vehicle. For example, a vehicle display system may include a vehicle (not shown) and a vehicle display in the vehicle including an optical system (e.g., optical system 100) including a backlight light guide 108, ATF 110, spreader 114, and LCD 118. In other examples, a vehicle display system may include ATF 110 and spreader 114. In some examples, a vehicle display including optical system 100 may have a vertical angular light distribution substantially in the range of ±30 degrees centered between ±10 degrees relative to a center viewing angle normal the display surface, with low light levels at greater than approximately +35 degrees, where the + direction is upward (i.e., toward the windscreen). In other examples, a vehicle display including optical system 10 may have a vertical angular light distribution substantially between −10 degrees and +20 degrees relative to a center viewing angle normal the display surface, with low light levels (e.g., less than about 5% maximum luminance) at greater than approximately +35 degrees, where the + direction is upward (i.e., toward the windscreen), where the center viewing angle is based on the vertical angle of intersection between the cabin occupant and the display normal in the particular layout of the vehicle.

Figure 2:
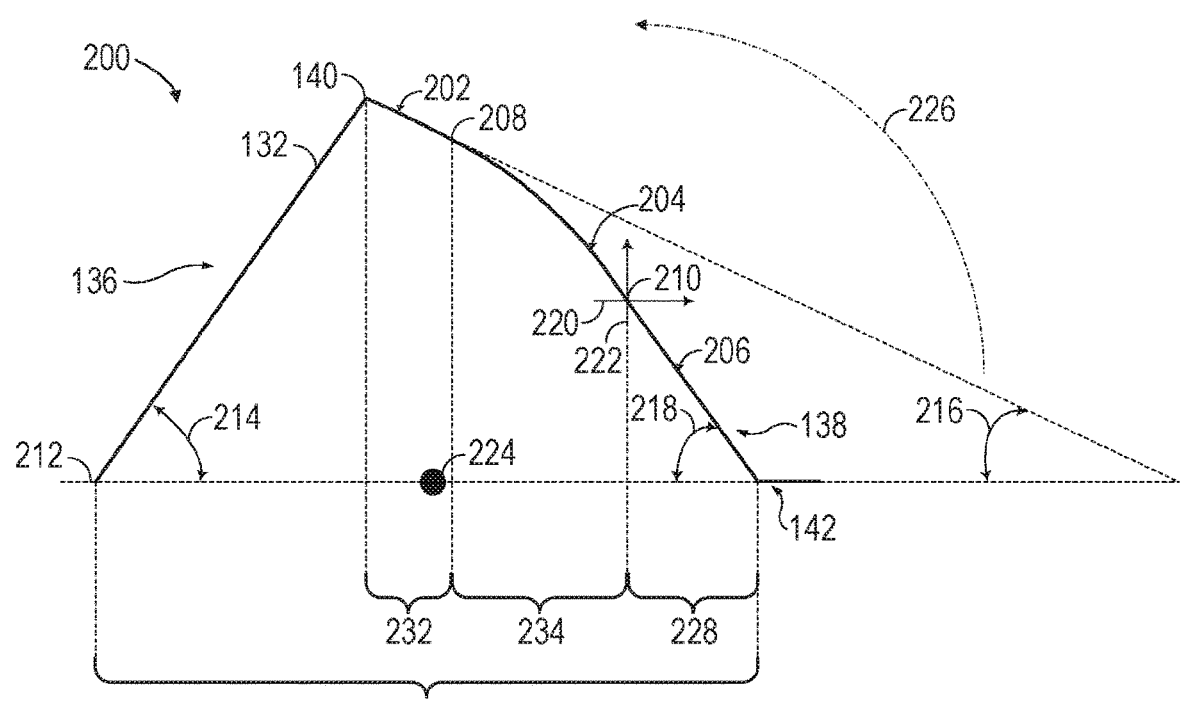
FIG. 2 is a conceptual and schematic side cross-section of an ATF microstructure prism (an "ATF prism") with planar and non-planar facets.

FIG. 2 is a conceptual and schematic side cross-section of an asymmetric turning film microstructure prism ("ATF prism") 200 with planar and non-planar facets. ATF prism 200 may include the features as describe above with respect to microstructures 134 of FIG. 1, e.g., ATF prism 200 may include structured surface 132, first side 136, second side 138, vertex 140, and valley 142. In some examples, first side 136 may include an injection face through which a substantial fraction of the light from light guide assembly 102 is transmitted. In some examples, second side 138 may include a turning face from which a substantial portion of light is reflected.

In some examples, second side 138 may include first surface segment 202, second surface segment 204, and third surface segment 206. In some examples, first surface segment 202 may define a substantially planar surface. For example, a substantially planar surface may include a segment with an angular range of less than about 4 degrees, or less than about 2 degrees, or less than about 1 degree. In some examples, second surface segment 204 may define a non-planar surface. In some examples, second surface segment may be substantially convex. In other examples, second surface segment 204 may be substantially concave. In some examples, third surface segment 206 may define a substantially planar surface.

In some examples, first surface segment 202 may extend from vertex 140 to transition point 208, and the second surface segment 204 may extend from first transition point 208 towards valley 142 between ATF prism 200 and an adjacent prism (i.e., between microstructures 134 and an adjacent microstructure). In other examples, not shown in FIG. 2, the first surface segment may extend from the valley to the first transition point, and the second surface segment may extend from the first transition point towards the vertex.

In some examples, the distance between vertex 140 and first transition point 208 may be between at about 3 percent to about 15 percent of the distance between vertex 140 and valley 142 of the respective asymmetric microstructure. In other examples, not shown in FIG. 2, the distance between the valley and the first transition point may be between about 3 percent to about 50 percent of the distance between the vertex and the valley of the respective asymmetric microstructure. In some examples, the distance between first transition point 208 and valley 142 is between about 85 percent to about 97 percent of the distance between vertex 140 and valley 142 of the respective asymmetric microstructure. In other examples, not shown in FIG. 2, the distance between the first transition point and the vertex is between about 50 percent to about 97 percent of a distance between the vertex and the valley of the respective asymmetric microstructure.

In some examples, first surface segment 202 may extend from vertex 140 to first transition point 208, second surface segment 204 may extend from first transition point 208 to second transition point 210, and third surface segment 206 may extend from second transition point 210 towards valley 142 between ATF prism 200 and an adjacent prism (i.e., between microstructures 134 and an adjacent microstructure). In other examples, not shown in FIG. 2, the first surface segment may extend from the valley to the first transition point, and the second surface segment may extend from the first transition point to the second transition point, and the third surface segment may extend from the second transition point towards the vertex.

In some examples, the distance between vertex 140 and first transition point 208 may be between at about 3 percent to about 15 percent of the distance between vertex 140 and valley 142 of the respective asymmetric microstructure; the distance between first transition point 208 and second transition point 210 may be between about 35 percent to about 94 percent of the distance between vertex 140 and valley 142 of the respective asymmetric microstructure; and the distance between second transition point 210 and valley 142 may be between about 3 percent and about 50 percent of the distance between vertex 140 and valley 142 of the respective asymmetric microstructure. In other examples, not shown in FIG. 2, the distance between the valley and the first transition point may be between at about 3 percent to about 50 percent of the distance between the vertex and the valley of the respective asymmetric microstructure; the distance between the first transition point and the second transition point may be between about 35 percent to about 94 percent of the distance between the vertex and the valley of the respective asymmetric microstructure; and the distance between the second transition point and the vertex may be between about 3 percent and about 15 percent of the distance between the vertex and the valley of the respective asymmetric microstructure.

In some examples, ATF prism 200 may define reference plane 212 substantially parallel to first major surface (not shown). In some examples, injection angle 214 may be the angle between reference plane 212 and first side 136. In some examples, injection angle 214 may be between about 40 degrees and about 90 degrees relative to reference plane 212. In some examples, first angle 216 (e.g., tip angle) may be the angle between reference plane 212 and first surface segment 202. In some examples, first angle 216 may be between about 40 degrees and about 90 degrees relative to reference plane 212, or between about 40 degrees and about 70 degrees relative to reference plane 212. In some examples, second angle 218 (e.g., base angle) may be the angle between reference plane 212 and third surface segment 202. In some examples, second angle 218 may be between about 40 degrees and about 70 degrees relative to reference plane 212.

In some examples, ATF 200 may include a center 224 about which ATF prism 200 may be rotated during the design process to provide desirable depth offset and tilt. For example, injection angle 214, first angle 216, second angle 218, and the tilt of the second surface segment may be transformed by rotating ATF prism 200 around center 224 in positive direction of rotation 226, and then reducing the depth and clipping it to the reference plane. As another example, injection angle 214, first angle 216, second angle 218, and the tilt of the second surface segment may be transformed by rotating ATF prism 200 around center 224 in positive direction of rotation 226, and then increasing the depth and extrapolating first side 136 and/or second side 138 to reference plane 212.

In some examples, ATF prism 200 may have a base linear fraction, which may be defined as the ratio of third surface segment length 228 to prism base length 230. In some examples, ATF prism 200 may have a tip linear section fraction, which may be defined as the ratio of the first surface segment length 232 to prism base length 230. In some examples, ATF prism 200 may include second surface segment length 234.

In some examples, the shape of second surface segment 204 may be based on an equation in a coordinate system aligned to the plane of ATF prism 200 with an origin at second transition 210 (i.e., the coordinate system has x-axis 218 and y-axis 220 with an origin where second surface segment 204 joins third surface segment 206). In other examples, the coordinate system may be aligned to start and end points of second surface segment 204, aligned with first surface segment 202, aligned with third surface segment 206, or the like. In other examples, the coordinate system origin may be aligned at first transition 208, at the center of second surface segment 204, or the like. In some examples, the shape of second surface segment 204 may by based on a cubic equation given by the equation:

$$y = D \cdot x^3 + C \cdot x^2 + B \cdot x + A \quad \text{(Equation 1)}$$

where A, B, C, and D are adjustable parameters. In other examples, the shape of second surface segment 204 may be based on a higher order equation, e.g., a quartic equation:

$$y = E \cdot x^4 + D \cdot x^3 + C \cdot x^2 + B \cdot x + A \quad \text{(Equation 2)}$$

where A, B, C, D, and E are adjustable parameters. In some examples, the adjustable parameters may be used to meet the continuity and continuous slope boundary conditions at the edges of second surface segment 204 (i.e., first transition 208 and second transition 210) and/or to control the distribution of curvature along second surface segment 204. For example, the shape of first surface segment 202 may be based on a first linear equation and the shape of second surface segment 204 may be based on a cubic equation, where a first derivative of the cubic equation matches the first linear equation. As another example, the shape of first surface segment 202 may be based on a first linear equation and the shape of second surface segment 204 may be based on a higher order equation (e.g., a quartic equation), where a first derivative of the higher order equation matches the first linear equation. In some examples, a cubic equation may provide for top-hat distributions because a cubic equation may give a linear second derivative that may produce a desired curvature distribution. In some examples, a quartic or higher order equation may provide a top-hat distribution because a quartic or higher order equation can give a quadratic or higher order second derivative variation which may produce a desirable low-high-low type absolute curvature distribution. In some examples, three adjustable parameters may be used to meet boundary constraints, i.e., to match the position and slope of first transition 208 or second transition 210, and any additional adjustable parameters may be used to control the curvature distribution of second surface segment 204.

In some examples, second surface segment 204 may be characterized by a second derivative ratio, which may be defined as the ratio of the second derivative, solved at second transition 210, of a cubic equation and the second derivative of a quadratic equation, solved at second transition point 210, having the same coordinate and slope as the cubic equation at second transition point 210 and the same slope as the cubic equation at first transition point 208.

In some examples, the first angle, second angle, first transition, and second transition may be adjusted during the design process to produce sharp edges of the top-hat distribution at the desired angular location and of the correct total height. In some examples, the adjustable parameters of the equation of the second surface segment may be adjusted to provide top-hat distribution. For example, a top-hat distribution may include a substantially flat-top region.

In some examples, a substantially flat-top may be depend on, for example, display application requirements (e.g., viewing distance, display size, display orientation relative to the viewer, or the like), the response of the human vision systems (i.e., the human eye and nervous system structures associated with vision) as understood through vision science, industry practices, and manufacturing requirements (e.g., tolerance bands to allow for variations in the fabrication of a real device, and the like). It is understood that, in some examples, perceptible brightness variation may depend on the angular frequency of the variation as viewed from the eye. It is understood that, in some examples, angular frequency of the variations may be related to equivalent spatial variations in a display at a specific viewing distance (e.g., a 60 centimeter view distance). It is understood that, in some examples, visibility of brightness modulation patterns may include a dynamic character that may increase perception of brightness modulation patterns by a factor of 2, or a factor of 4 where the observer or a brightness modulation pattern on a display is in motion or temporally modulated. In some examples, desirable angular frequency ranges may be considered as dependent on brightness variation including a low angular frequency low-high-low brightness modulation pattern across the substantially flat-top of the top-hat distribution. In some examples, angular frequency ranges may be considered as dependent on a brightness modulation consisting of a higher angular frequency variation within a region where the brightness has one or more extents of a high-low-high brightness pattern. In some examples, a uniformity of a brightness variation may be defined in terms of a brightness ratio, i.e., a ratio of a minimum brightness to a maximum brightness. In some examples, the brightness ratio may be at least about 70%, or at least about 80%, or greater than about 85%. In some examples, additional tolerance bands may be required. In some examples, higher angular frequency modulation may have different design requirements based on the specific spatial frequency of the modulation.

In some examples, a substantially flat-top region of a top-hat output distribution may include a distribution with less than about 5% modulation (i.e., less than 10% peak to peak variability of the output distribution in the flat-top region), or less than about 4% modulation, or less than about 3% modulation, or less than about 2% modulation, or less than about 1% modulation. In some examples, the adjustable parameters of the equation of the second surface segment may be adjusted by a non-linear optimizer coupled with a merit function.

Figure 3:
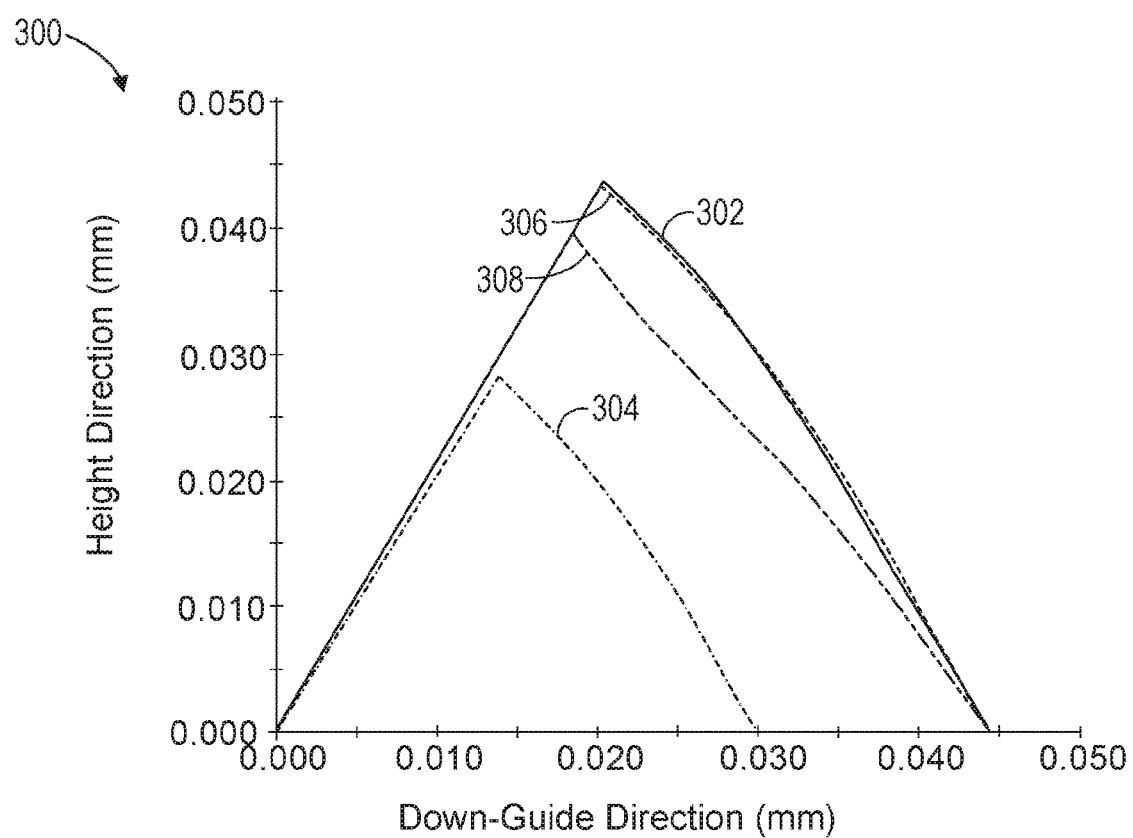
FIG. 3 is a plot of down-guide direction versus height direction illustrating conceptual and schematic cross-sections of four example ATF prisms.

FIG. 3 is a plot 300 of down-guide direction versus height direction illustrating conceptual and schematic cross-sections of four example asymmetric turning film microstructure prisms (ATF prisms) 302, 304, 306, 308. As shown in FIG. 3, ATF prisms 302, 304, 306, 308 may include a prism base length that may be measured from an origin at the base of the first side where the down-guide direction is the positive direction (i.e., the negative direction is toward the light source side). As shown in FIG. 3 AFT prisms 302, 304, 306, 308 may include a prism height that may be measured from an origin at the base of the first side where the positive direction is toward the lightguide (i.e., the negative direction is toward the display surface). As shown in FIG. 3, ATF prisms 302, 304, 306, 308 may include a planar face and a non-planar face. For example, as shown in FIG. 3, ATF prisms 302 and 306 may consist of a first surface segment that may be substantially planar (e.g., having a range of slopes that span a range of less than 9 degrees, and preferably less than 5 degrees, and more preferably less than 2 degrees), a second surface segment that may be substantially non-planar (e.g., shaped by a functional form such as a cubic, quadric, or higher order equation with suitable adjustable parameters or coefficients), and a third surface segment that may be substantially planar. In some examples, as discussed above with respect to FIG. 2, an ATF prism may include a center about which ATF prism 200 may be rotated during the design process to provide desirable depth offset and tilt. For example, a suitable depth offset and a suitable tilt was applied to ATF prism 302 to create the shape of ATF prism 304, thereby ATF prism 302 was transformed into ATF prism 304 by rotating around the prism center in the positive direction of rotation, and then reducing the depth and clipping it to the reference plane, which changed the injection angle, first angle, second angle, and the tilt of the second surface segment.

Table 1 shows the ATF prism design parameters of prisms 302, 304, and 306, including, for example, injection angle, base linear fraction, second angle (i.e., base angle), tip linear fraction, first angle (i.e., tip angle), second derivative ratio, pitch, and tilt.

TABLE 1

| Prism | Injection Angle (degrees) | Base Linear Fraction | Base Angle (degrees) | Tip Linear Fraction | Tip Angle (degrees) | Second Derivative Ratio | Pitch (mm) | Tilt (degrees) |
| --- | --- | --- | --- | --- | --- | --- | --- | --- |
| 302 | 65.00 | 0.2335 | 64.88 | 0.0305 | 49.64 | 1.164 | 0.04440 | 0.00 |
| 304 | 65.00 | 0.2335 | 64.88 | 0.0305 | 49.64 | 1.164 | 0.02993 | −1.00 |
| 306 | 65.00 | 0.1525 | 66.15 | 0.0342 | 50.19 | 1.419 | 0.04440 | 0.00 |

In some examples, ATF prism 300 may include a fourth surface segment. In some examples, ATF prism 300 may include a plurality of surface segments. In some examples, second surface segment may include two segments, each segment defined by a separate linear, cubic, or higher order equation. In some examples, the shape second side 138 may be substantially continuous and have a substantially continuous slope. In other examples, the shape of second side 138 may be discontinuous or otherwise segmented, or have discontinuous slopes. For example, second surface segment 204 may include piecewise arcs, e.g., piecewise circular arcs, piecewise arcs of a second degree or higher polynomial, or the like. In such examples, the piecewise circular arcs may be all convex, all concave, or alternate between the two in a regular or irregular pattern. As shown in FIG. 3, ATF prism 308 may include four surface segments, where the second surface segment and the fourth surface segment include piecewise circular arcs.

Figure 4:
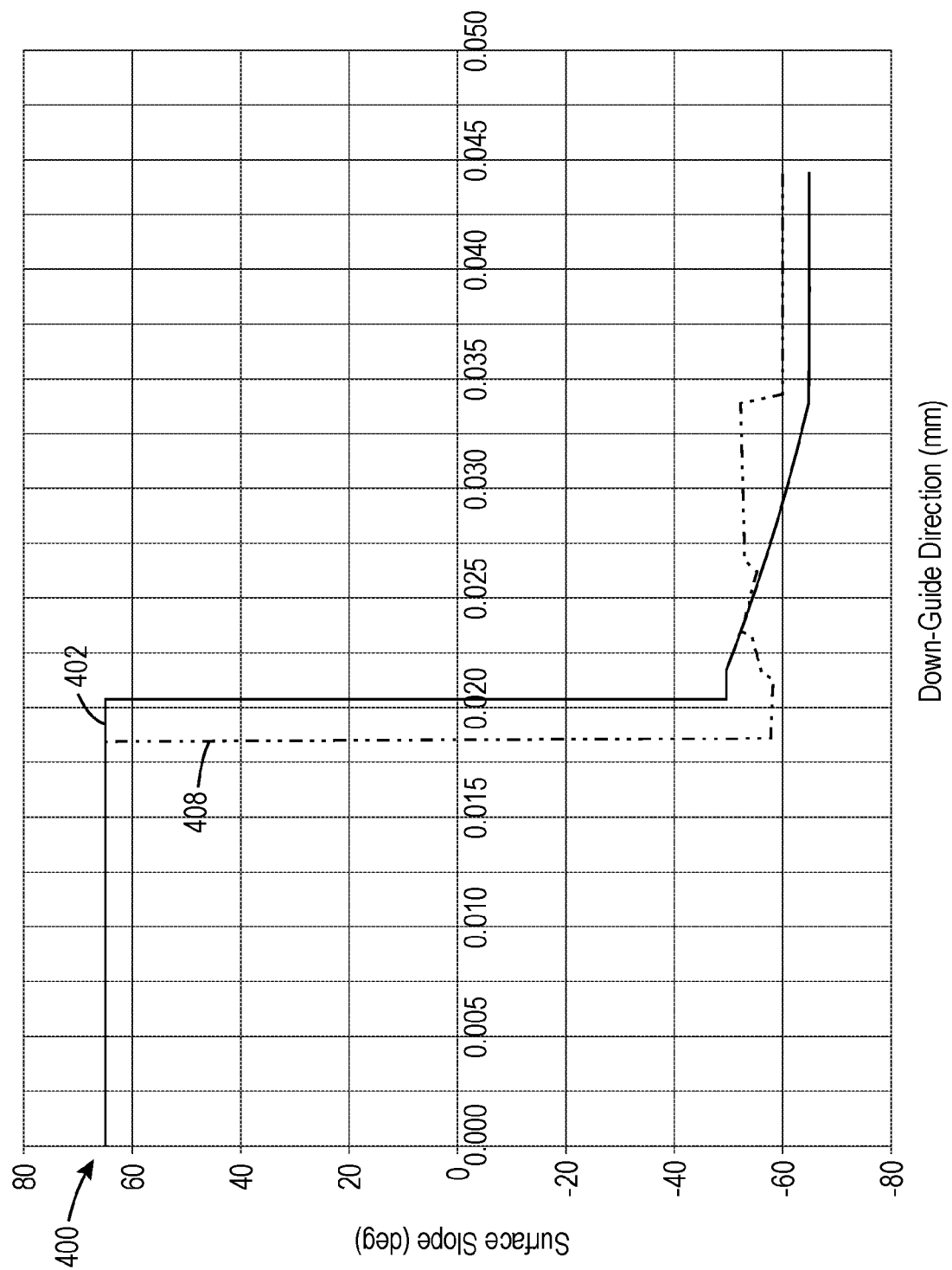
FIG. 4 is an example plot of down-guide angle versus surface slope for example ATF prisms of FIG. 3.
Figure 5:
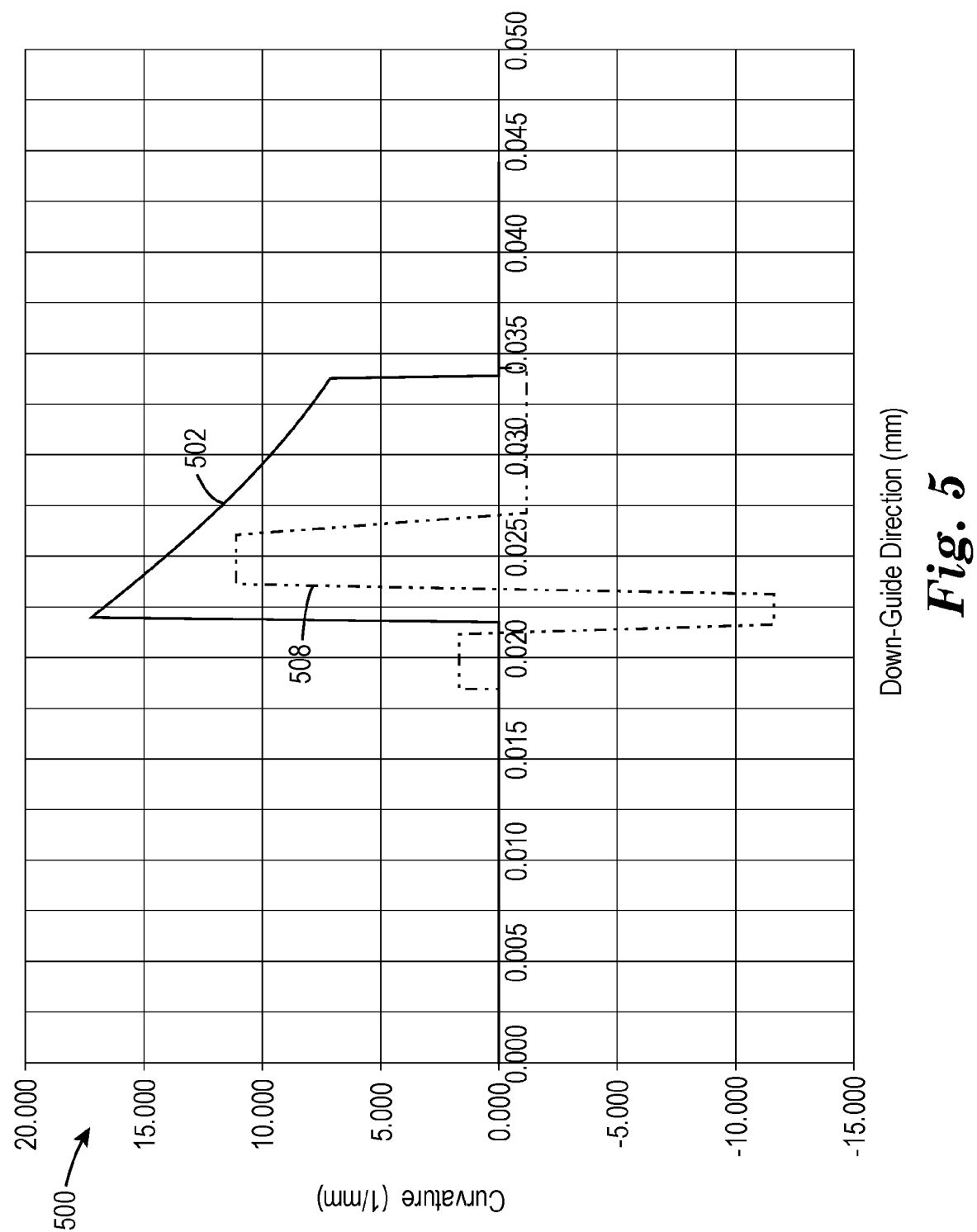
FIG. 5 is an example plot of down-guide angle versus curvature for example ATF prisms of FIG. 3.

FIG. 4 is an example plot 400 of down-guide angle versus surface slope for the example ATF prisms 302 and 308 of FIG. 3. In the example of FIG. 4, curves 402 and 408 correspond to ATF prisms 302 and 308, respectively. FIG. 5 is an example plot 500 of down-guide angle versus curvature for the example ATF prisms 302 and 308 of FIG. 1n the example of FIG. 5, curves 502 and 508 correspond to ATF prisms 302 and 308, respectively. As shown in the examples of FIGS. 4 and 5, examples ATF prisms may include a first surface segment that may be substantially planar (i.e., linear), a second surface segment that may include a higher curvature blend region, and a third surface segment that may be substantially planar (i.e., linear). In some examples, the third surface segment may substantially extend to the base of the ATF prism. In other examples, the third surface segment may not extend to the base of the ATF prism. In some examples, at least a portion of the third surface segment may be shadowed by an adjacent ATF prism. In some examples, the shape of the portion of the third surface segment shadowed by an adjacent microstructure may not affect the light distribution of the ATF. In some examples, at least a portion of the third surface segment shadowed by an adjacent ATF prism may join to a fourth surface segment of some other slope or shape (e.g., a concave or convex shape; or a circular, quadratic, cubic, or quartic; or the like).

EXAMPLES

Figure 6:
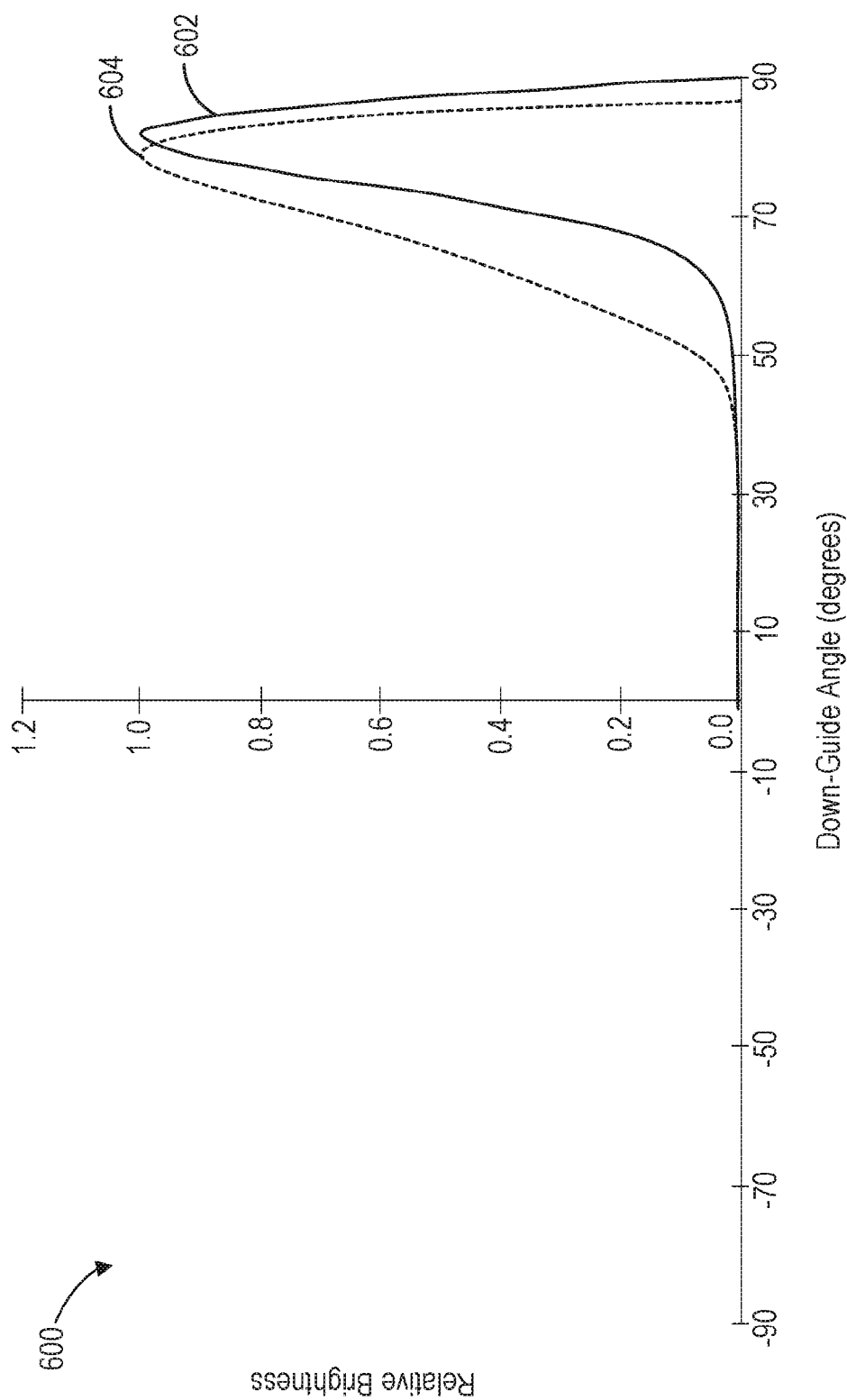
FIG. 6 is an example plot of down-guide angle versus relative brightness showing light input distributions that may be incident on an ATF.

FIG. 6 is an example plot 600 of down-guide angle versus relative brightness for first and second light input distributions that may be incident on an asymmetric turning film. In some examples, an ATF light input distribution may be the light output distribution of a lightguide assembly. For example, as shown in FIG. 1, light beam 120 may represent the substantially collimated light output distribution an angle 122 of lightguide assembly 102, i.e., the light output distribution of lightguide assembly may have a full-width half maximum (FWHM) of less than about 40 degrees centered on angle 122.

As shown in FIG. 6, a first lightguide assembly may output a first down-guide cross-section input distribution 602 and a second lightguide assembly may output second down-guide cross-section input distribution 604. In some examples, a down-guide cross-section input distribution may affect the shape of ATF microstructures that may create a top-hat output distribution. In the example of FIG. 6, distribution 602 was measured on a physical sample (i.e., a Sure View light guide assembly, available from Hewlett-Packard Company, Palo Alto, Calif.). In the example of FIG. 6, distribution 604 was constructed from the down-guide cross-section which was measured on another physical sample (i.e., a light guide assembly from a XPS laptop available from Dell, Round Rock, Tex.). For both distribution 602 and 604, the horizontal brightness profile was characterized using a goniometer available from Westar, St. Charles, Mo. and a PR-705 SpectraScan spectroradiometer available from Photo Research, Syracuse, N.Y. The cross-section was swept ±20 degrees to create an approximate distribution, and then the center was filled by sweeping the center ±20-degree area±90 degrees to construct an approximate near cross-section axis model for ray-tracing.

Figure 7:
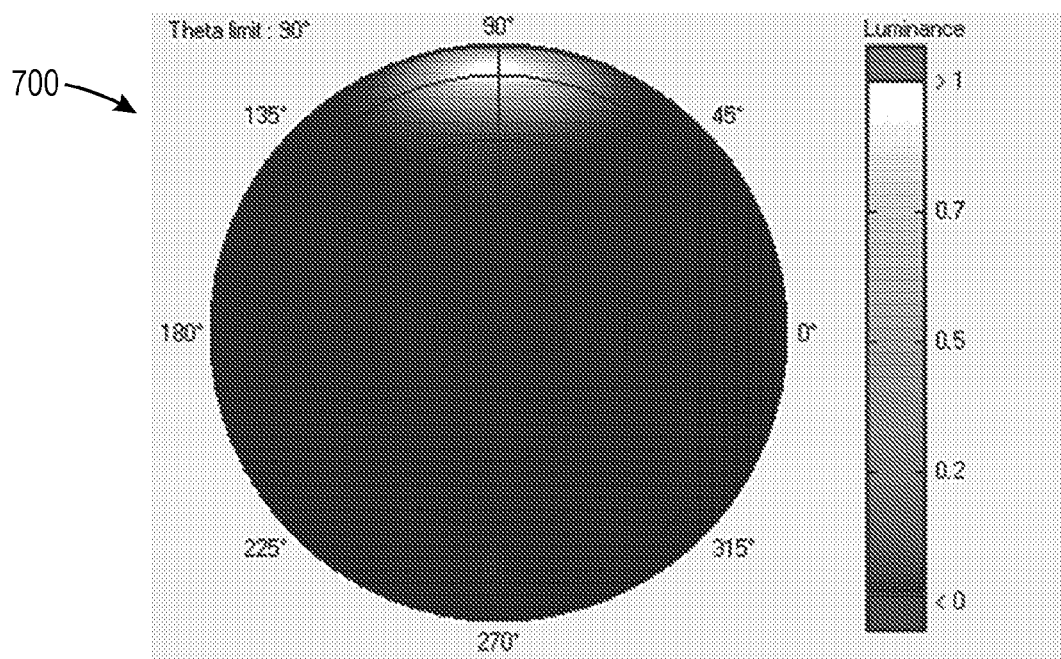
FIG. 7 is an example conoscopic plot of polar angle and azimuthal angle versus relative brightness that may be incident on an ATF for a down-guide cross-section light input distribution of FIG. 6.
Figure 8:
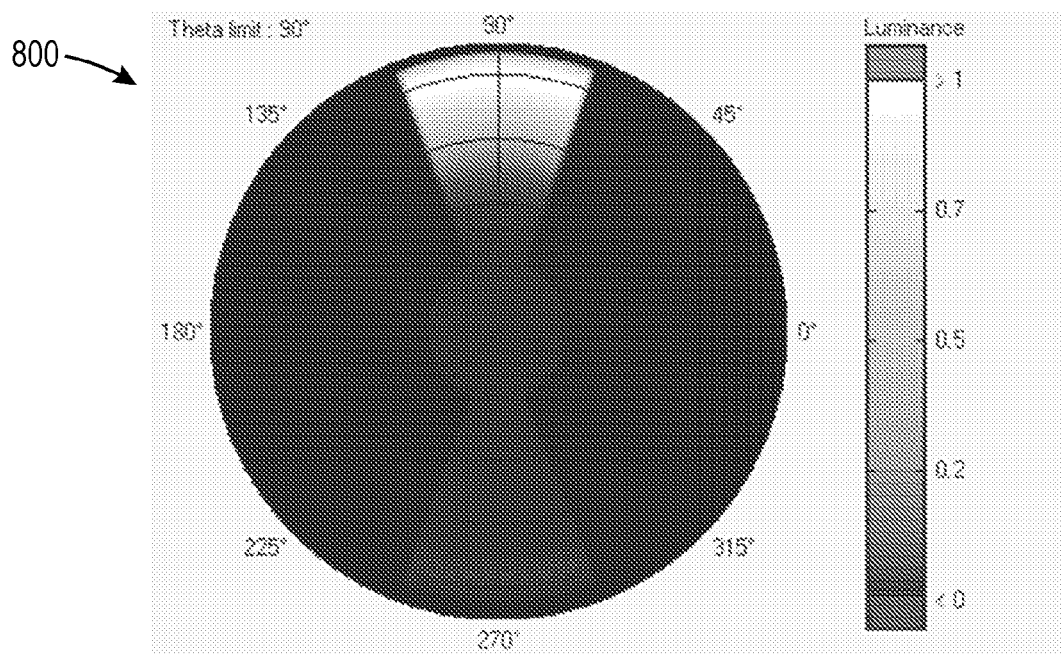
FIG. 8 is an example conoscopic plot of polar angle and azimuthal angle versus relative brightness that may be incident on an ATF for a down-guide cross-section light input distribution of FIG. 6.

FIG. 7 is an example conoscopic plot 700 of polar angle and azimuthal angle versus relative brightness that may be incident on an ATF for first down-guide cross-section light input distribution 602 of FIG. 6. FIG. 8 is an example conoscopic plot 800 of polar angle and azimuthal angle versus relative brightness that may be incident on an ATF for second down-guide cross-section light input distribution 604 of FIG. 6. In the examples of FIGS. 7 and 8, the coordinate systems have a down-guide direction toward the 90-degree azimuthal angle and a light source direction toward the 270-degree azimuthal angle.

It is understood, for example, in the case of a vehicle display system, that the cabin coordinate system may define +/up and −/down, which may or may not match the directions shown in FIG. 6, 7, or 8. As such, the direction indicated as up or down is for the convenience of describing the figures and may not necessarily describe the configuration of the ATF, for example, the orientation of the ATF or optical system in a vehicle display assembly. For example, an optical system may generate a top-hat distribution that may have sharper cutoff on the negative direction (as compared to the positive direction) on a down-guide cross-section input distribution, e.g., first down-guide cross-section light input distribution 602 or second down-guide cross-section light input distribution 604 of FIG. 6. In such examples, it may be desirable orient the negative direction to align with the +/up direction in cabin coordinates.

Figure 9:
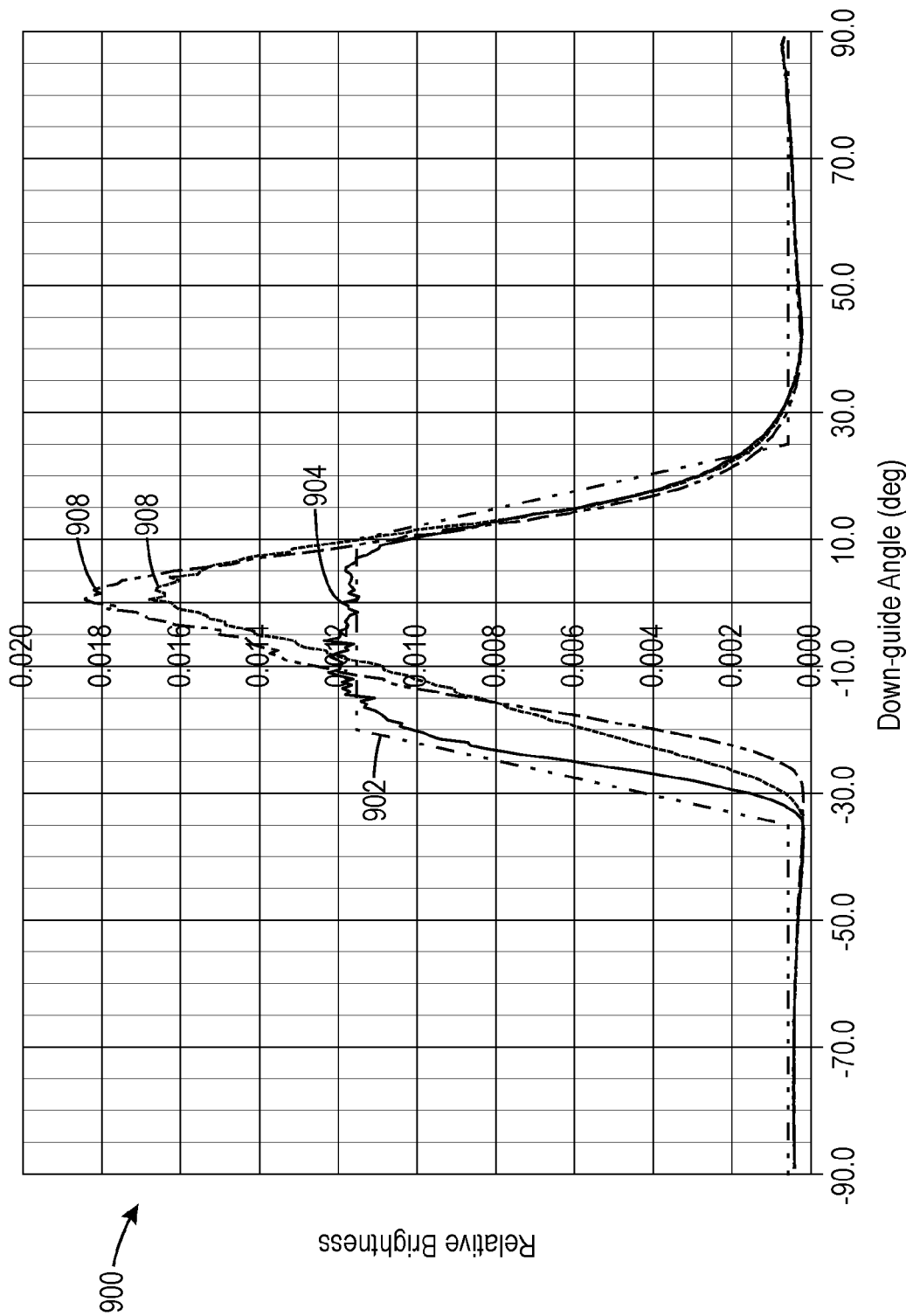
FIG. 9 is an example plot of down-guide angle versus relative brightness showing light output distributions of example optical systems with example ATF prisms of FIG. 3 from a down-guide cross-section light input distribution of FIG. 6.

FIG. 9 is an example plot 900 of down-guide angle versus relative brightness showing light output distributions of example optical systems with the example ATF prisms 302, 304, and 306 of FIG. 3 from first down-guide cross-section light input distribution 602 of FIG. 6. In some examples, at least about 60 percent of light originating from the light guide and exiting through the first major surface may be included in a first set of characteristic viewing angles, where the first major surface defines a center viewing angle normal to the first major surface. For example, the first set of characteristic viewing angles may be between about −35 degrees and about 35 degrees relative to the center viewing angle. As another example, the first set of characteristic viewing angles may be between about −20 degrees and about 20 degrees relative to the center viewing angle relative to the center viewing angle.

In the example of FIG. 9, the optical system may include features substantially similar to optical system 100 of FIG. 1. In the example of FIG. 9, ATF prisms 302, 304, and 306 are assumed to have a real refractive index of 1.565 and an imaginary refractive index of $9.104 \times 10^{-7}$, and a reflectance optical property looking back into the lightguide assembly of 0.965 specular and 0.02 Lambertian. In the example of FIG. 9, the optical system may include a substrate assumed to have a refractive index of 1.58, and absorption coefficient of 0.0191 per millimeter, and thickness of 86.2 microns. In the example of FIG. 9, the optical system may include a spreader assumed to have a refractive index of 1.7 and an absorption coefficient of 0.0107 per millimeter, and bonded to a rear polarizer of an LCD with an adhesive. In the example of FIG. 9, the adhesive may have a refractive index 1.5, a thickness of 100 microns, and may fully fill the spreader features. In the example of FIG. 9, the LCD may be assumed to have a transmission of the rear polarizer in pass state of 0.95 and in the block state of 0.001, and an internal module back reflection of 0.001, a material index of 1.5, and scattering resulting from a surface deviation of 9 degrees at the exiting air boundary. In some examples, the actual slope distribution of the surface deviation of 9 degree may be similar to that of a partial sphere surface deviation. In some examples, the optical system features may be omitted or have other values, e.g., it is understood that the reflectance values and input distributions are for example purposes only, and that the optical systems described herein may be used with other reflectance values and other light distributions.

As shown in the example of FIG. 9, a target top-hat distribution may be illustrated as target top-hat distribution 902. In some examples, target top-hat distribution 902 may include a substantially flat-top, e.g., a flat-top region of the output distribution with less than about 5% modulation (i.e., less than 10% peak to valley variability of the output distribution in the flat-top region), or less than about 4% modulation, or less than about 3% modulation, or less than about 2% modulation, or less than about 1% modulation. In some examples, target top-hat distribution 902 may include a substantially flat-top between about −20 and about 10 degrees. In some examples, target top-hat distribution 902 may include a floor outside of the top-hat region (e.g., relative brightness less than or equal to about 5% of peak relative brightness, for either one or both sides of the light distribution outside the top-hat region). In some examples, target top-hat distribution 902 may include substantially sharp edge transitions at or near a cut-off angle (e.g., a transition less than about 15 degrees from the flat top region to the floor region, for either one or both sides of the top-hat). In some examples, target top-hat distribution 902 may include other criterion such as, for example, the top-hat centered on a specific down-guide angle, the top-hat having sharp edge transitions near an upper cutoff angle and a lower cutoff angle, a floor region relative brightness within a percentage of a flat top region relative brightness.

In some examples, an ATF prism may be configured to produce a top-hat output distribution for a given light input distribution, e.g., where the light guide inputs light into the ATF at a light input distribution, the first angle, the cubic equation, and the second angle may be based on the light input distribution. For example, as shown in FIG. 9, ATF prism 302 may produce a light distribution 904 that may approximate a target top-hat distribution 902 when using input distribution 602. In other examples, an AFT prism may be configured to produce an output distribution that matches a target top-hat distribution. In other examples, an AFT prism may be configured to produce an output distribution that is substantially like a target top-hat distribution. In other examples, an AFT prism may be configured to produce an output distribution that resembles a target top-hat distribution.

In some examples, an ATF prism may not produce a top-hat output distribution for a given light input distribution. For example, as shown in FIG. 9, ATF prism 304 may produce a light distribution 908 that does not match (or is not substantially like) target top-hat distribution 902. As another example, as shown in FIG. 9, ATF prism 306 may produce a light distribution 906 that does not match (or is not substantially like) target top-hat distribution 902.

In some examples, as in the example of FIG. 9, optical systems with ATF prisms with a substantially convex second surface segment and the second angle (i.e., base angle) is greater than the first angle (i.e., tip angle), the plus edge of the top-hat output distribution may originate from the first surface segment and the minus edge of the top-hat output distribution may originate from the third surface segment. In other examples, optical systems with ATF prisms with a substantially concave second surface segment and the second angle (i.e., base angle) is less than the first angle (i.e., tip angle), the plus edge of the top-hat output distribution may originate from the third surface segment and the minus edge of the top-hat output distribution may originate from the first surface segment.

Figure 10:
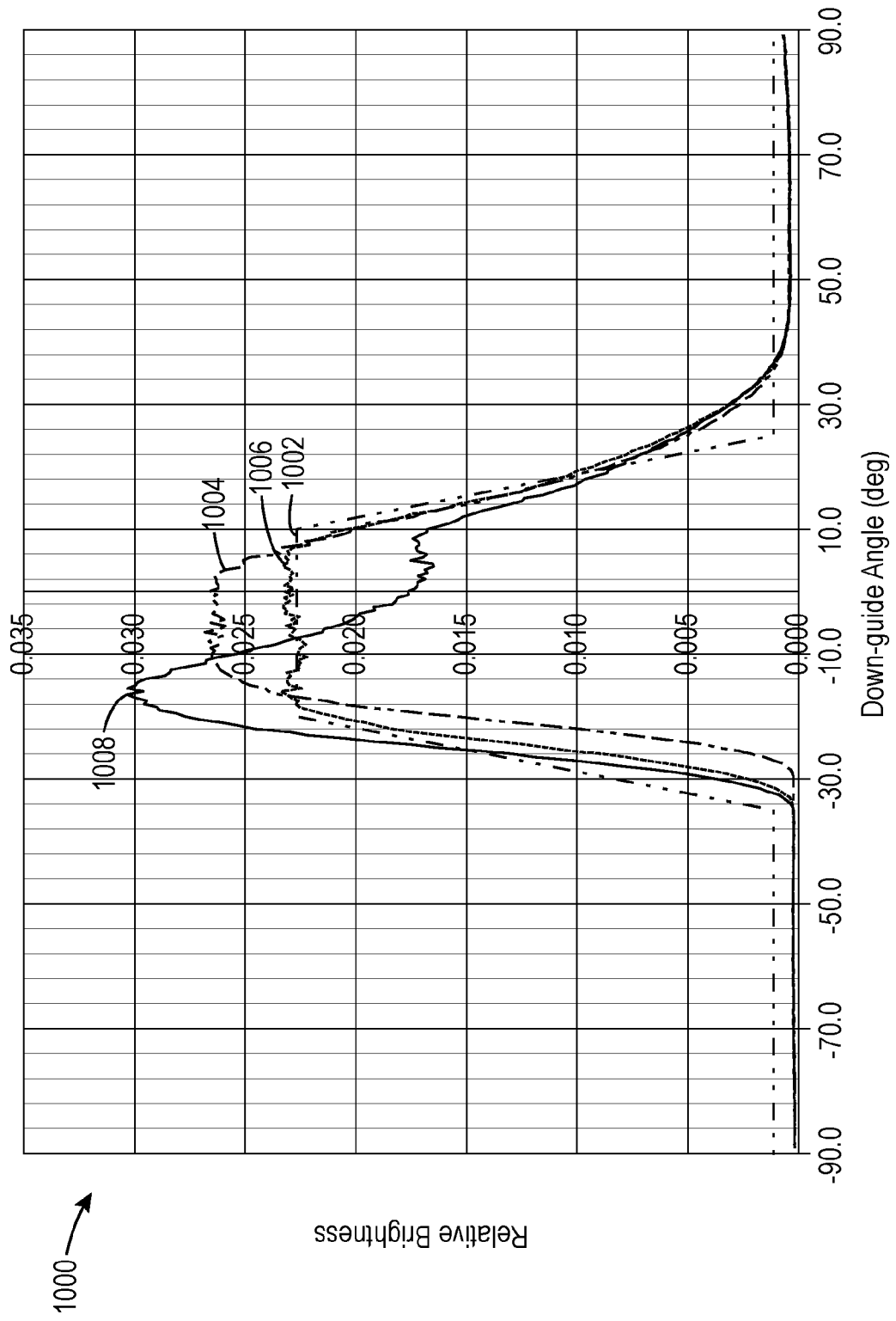
FIG. 10 is an example plot of down-guide angle versus relative brightness showing light output distributions of example optical systems with example ATF prisms of FIG. 3 from a down-guide cross-section light input distribution of FIG. 6.

FIG. 10 is an example plot 1000 of down-guide angle versus relative brightness showing light output distributions of example optical systems with the example ATF prisms 302, 304, and 306 of FIG. 3 from second down-guide cross-section light input distribution 604 of FIG. 6. In the example of FIG. 10, the optical system may be substantially similar to the optical system as described above with respect to FIG. 9.

As shown in the example of FIG. 10, a target top-hat distribution may be illustrated as target top-hat distribution 1002. Target top-hat distribution 1002 may include the subject matter discussed above of with respect to target top-hat distribution 902 of FIG. 9.

In some examples, an ATF prism may be configured to produce a top-hat output distribution for a given light input distribution. For example, as shown in FIG. 10, ATF prism 306 may produce a light-distribution 1004 that approximates the target top-hat distribution 1002 when using input distribution 604.

In some examples, an ATF prism may not produce a top-hat output distribution for a given light input distribution. For example, as shown in FIG. 10, ATF prism 302 may produce a light distribution 1008 that does not match is not substantially like target top-hat distribution 1002 when using input distribution 604. As another example, as shown in FIG. 10, ATF prism 306 may produce a light distribution 1004 that does not is not substantially like target top-hat distribution 1002 when using input distribution 604.

As shown by comparison of FIGS. 7 and 8, an ATF prism shape that matches, is substantially similar to, approximates, or resembles a target top-hat distribution for a first input distribution may not match, be substantially similar to, approximate, or resemble a target top-hat distribution for a second input distribution. For example, ATF prism 302 produces distribution 904 that approximates top-hat distribution 902 given input distribution 602, but ATF prism 302 produces distribution 1008 that does not approximate top-hat distribution 1002 given input distribution 604. As another example, ATF prism 304 produces distribution 1006 that approximates top-hat distribution 1002 given input distribution 604, but ATF prism 304 produces distribution 908 that does not approximate top-hat distribution 902 given input distribution 602. In this way, prism shape may depend on light input distribution.

Figure 11:
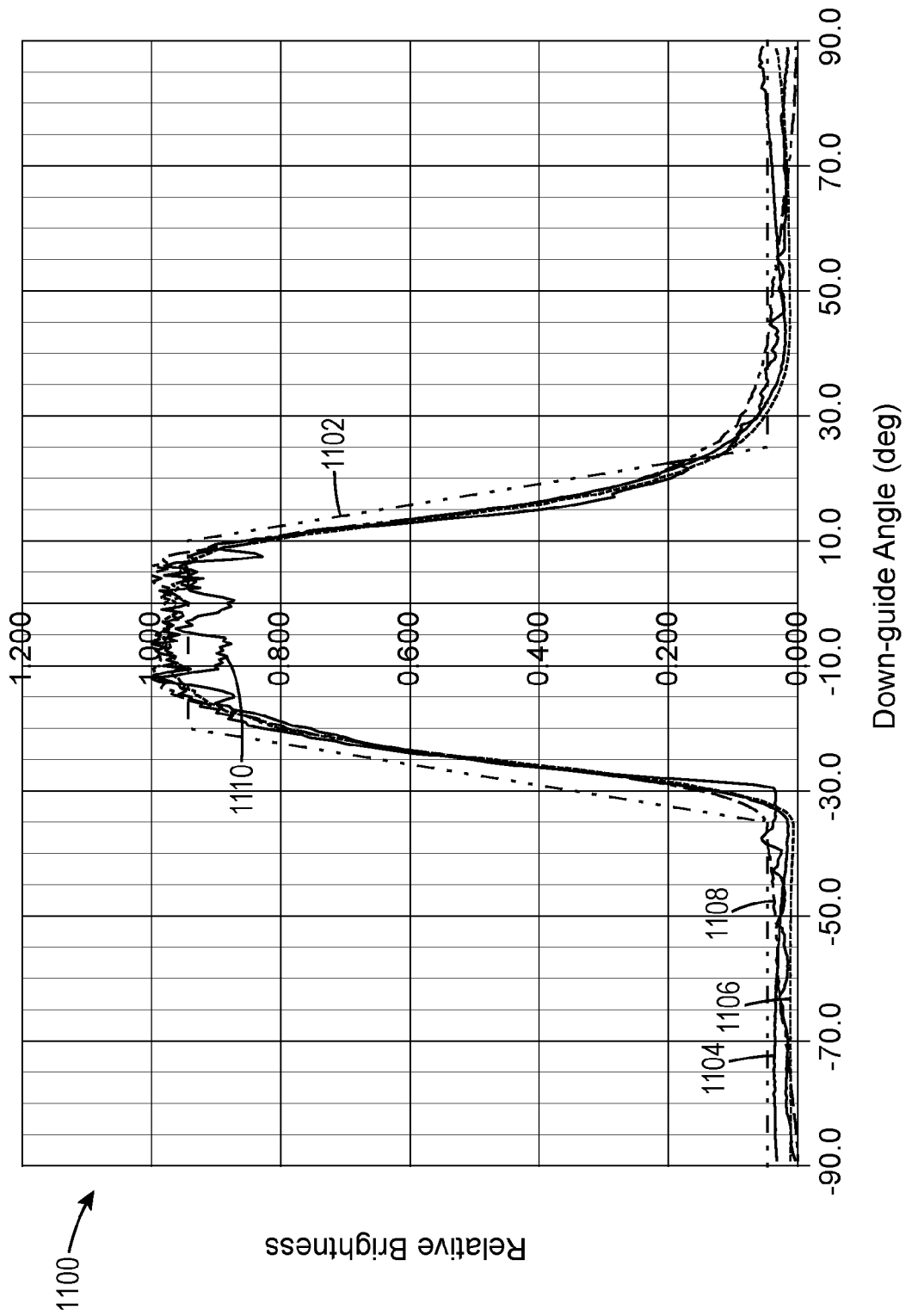
FIG. 11 is an example plot of down-guide angle versus relative brightness showing light output distributions of example optical systems with an ATF after removal of one or more components of the optical system.

FIG. 11 is an example plot 1100 of down-guide angle versus relative brightness (e.g., normalized luminance) showing light output distributions of an example optical system with an ATF with ATF prism 302 of FIG. 3 after removal of one or more components of the optical system. In the example of FIG. 10, the optical system may be substantially similar to the optical system as described above with respect to FIG. 9, except that one or more features of the optical system may be removed. In the example of FIG. 11, the optical system may include a spreader laminated and optically coupled to an LCD, where the LCD may include some diffusion from, for example, a rough anti-glare coating on the LCD surface.

As shown in the example of FIG. 11, a target top-hat distribution may be illustrated as target top-hat distribution 1102. As shown in FIG. 11, ATF prism 302 with a cubic second surface segment, a spreader, and an optical adhesive laminating and optically coupling the spreader to an LCD may produce output distribution 1104.

As shown in FIG. 11, an ATF prism with a cubic second surface segment laminated and optically coupled to an LCD by an optical adhesive and without spreader may produce output distribution 1106. In some examples, as shown by output distribution 1106, removal of the spreader layer may increase the light output over the floor portion and may not otherwise affect output distribution as compared to output distribution 1104 with the spreader.

As shown in FIG. 11, an ATF prism with a cubic second surface segment, a spreader, and an LCD without an optical adhesive laminating and optically coupling the spreader to the LCD may produce output distribution 1108. In some examples, as shown by output distribution 1108, removal of the optical adhesive may not affect the flat-top portion of the output distribution as compared to output distribution 1104 with the adhesive and may affect the floor portion of the output distribution (i.e., may increase the wide-angle stray light).

As shown in FIG. 11, an ATF prism with a cubic second surface segment, a spreader, and an optical adhesive without an LCD may produce output distribution 1110. In the example of output distribution 1110, removal of the LCD may affect the flatness of the flat-top portion and flatness of the floor portion of the output distribution as compared to output distribution 1104 with the LCD. In some examples, the change in flatness of the flat-top portion and flatness of the floor portion of the output distribution with removal of the LCD may indicate diffusion either in the LCD or in another location nearer the LCD is desirable. For example, this diffusion angle may be, for example, less than about 15 degrees in half-width at 5% of maximum luminance, or less than about 7 degrees in half-width at the 5% of maximum luminance, or less than about 4.5 degrees in half-width at 5% of maximum luminance.

Figure 12:
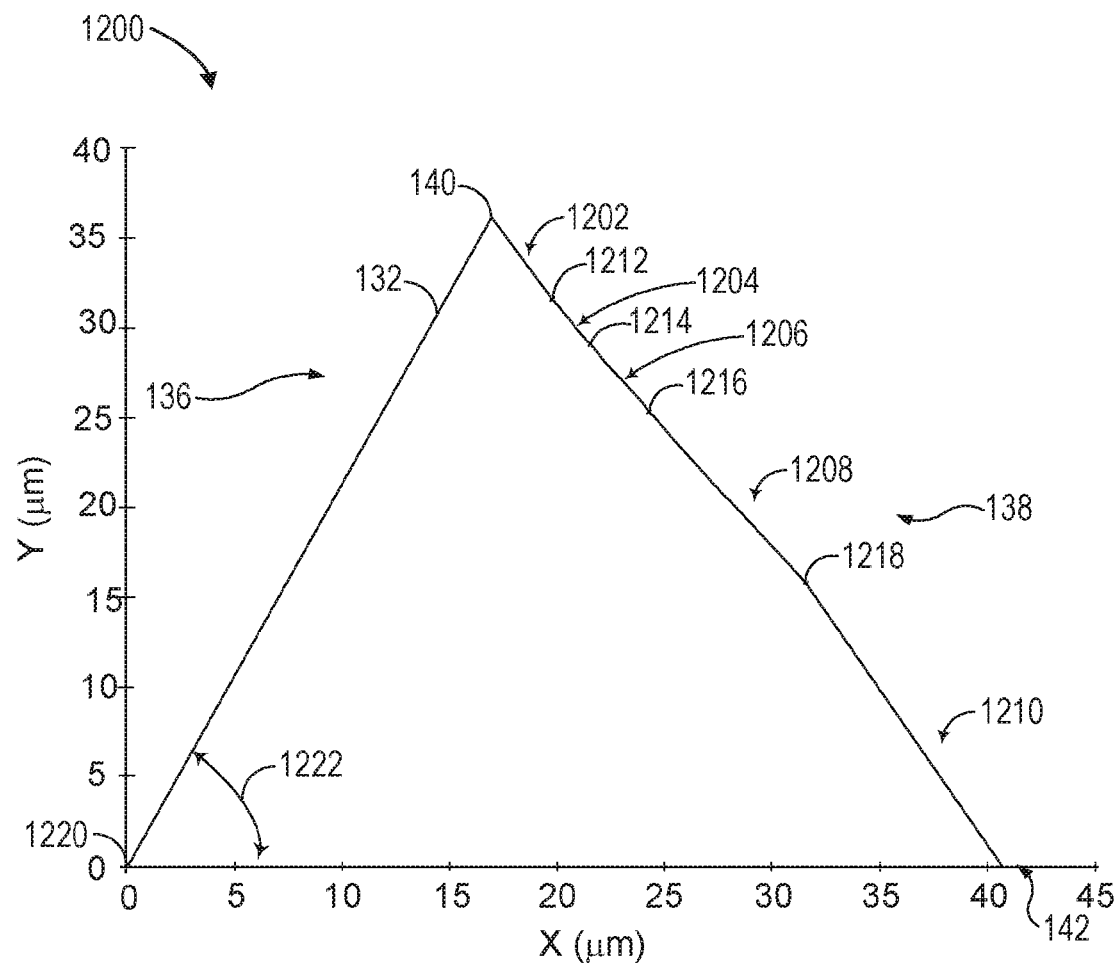
FIG. 12 is a conceptual and schematic cross-section of an ATF with multi-radius facet prisms.

FIG. 12 is a conceptual and schematic cross-section of an ATF with multi-radius facet prisms. ATF prism 1200 may include the features as describe above with respect to microstructures 134 of FIG. 1, e.g., ATF prism 1200 may include structured surface 132, first side 136, second side 138, vertex 140, and valley 142. In some examples, first side 136 may include an injection face through which a substantial fraction of the light from lightguide assembly 102 is transmitted. In some examples, second side 138 may include a turning face from which a substantial portion of light is reflected.

In some examples, second side 138 may include a plurality of surface segments. For example, the plurality of surface segments may include first surface segment 1202, second surface segment 1204, third surface segment 1206, fourth surface segment 1208, and fifth surface segment 1210.

In some examples, the plurality of surface segments may be any suitable length and shape. In some examples, first surface segment 1202 may extend from vertex 140 to first transition point 1212. In some examples, second surface segment 1204 may extend from first transition point 1212 to second transition point 1214. In some examples, third surface segment 1206 may extend from second transition point 1214 to third transition point 1216. In some examples, fourth surface segment 1208 may extend from third transition point 1216 to fourth transition point 1218. In some examples, fifth surface segment 1210 may extend from fourth transition point 1218 towards valley 142 between ATF prism 1200 and an adjacent prism. In some examples, first surface segment 1202 may define a substantially planar surface. In some examples, second surface segment 1204 may define a non-planar surface. In some examples, third surface segment 1206 may define a non-planar surface. In some examples, fourth surface segment 1208 may define a substantially planar surface. In some examples, fifth surface segment 1206 may define a substantially planar surface. In some examples, as shown in FIG. 12, ATF prism 1200 may be defined in a coordinate system with an origin at the base of first side 136, where the start of each of the plurality of segments may be defined as an X-Y coordinate, where the X-axis defines a reference plane from which a Base Angle of each of the plurality of segments may be measured, where each of the plurality of segments may have a Cord Length, where a curvature of each of the plurality of segments may be defined as a Total Arc in degrees, and where a Radius of Curvature of each of the plurality of segments may be defined from an origin Radius of Curvature $X_o$ and Radius of Curvature $Y_o$. For example, in the example of FIG. 12, the following table may define the plurality of surface segments:

TABLE 2

| Surface Segment | X (μm) | Y (μm) | Chord Length (μm) | Base Angle (degree) | Total Arc (degree) | Radius of Curvature (μm) | Radius of Curvature $X_0$ (μm) | Radius of Curvature $Y_0$ (μm) |
|---|---|---|---|---|---|---|---|---|
| 1202 | 16.90 | 36.24 | 5.50 | −58.00 | 0.5 | 630 | −516 | −300 |
| 1204 | 19.81 | 31.58 | 3.00 | −55.25 | −2 | 86 | 91 | 79 |
| 1206 | 21.52 | 29.11 | 4.7 | −53.80 | 3 | 90 | −50 | −26 |
| 1208 | 24.30 | 25.32 | 12.00 | −52.60 | −0.8 | 859 | 711 | 543 |
| 1210 | 31.59 | 15.79 | 18.23 | −60.00 | 0.0 | — | — | — |

In some examples, ATF prism 1200 may define reference plane 1220. In some examples, injection angle 1222 may be the angle between reference plane 1220 and first side 136. In some examples, injection angle 1222 may be between about 40 degrees and about 90 degrees relative to reference plane 1222. In the example of FIG. 12, injection angle 1222 was 65 degrees.

In some examples, as shown in FIG. 12, second side 138 may define a continuous face and each of the plurality of surface segments may define discontinuous in slopes at a respective plurality of transition points. As shown in FIG. 12, the slopes of each adjacent plurality of surface segments at a respective plurality of transition points may be small relative to each other. In the example of FIG. 12, the Total Arc of each adjacent surface segment may alternate between positive and negative curvature to reduce the slope differences between the sections. In other examples, the Total Arc of each adjacent surface segment may be all positive. In other examples, the Total Arc of each adjacent surface segment may be all negative. In other examples, the Total Arc of each adjacent surface segment may be some other arrangement.

Figure 13:
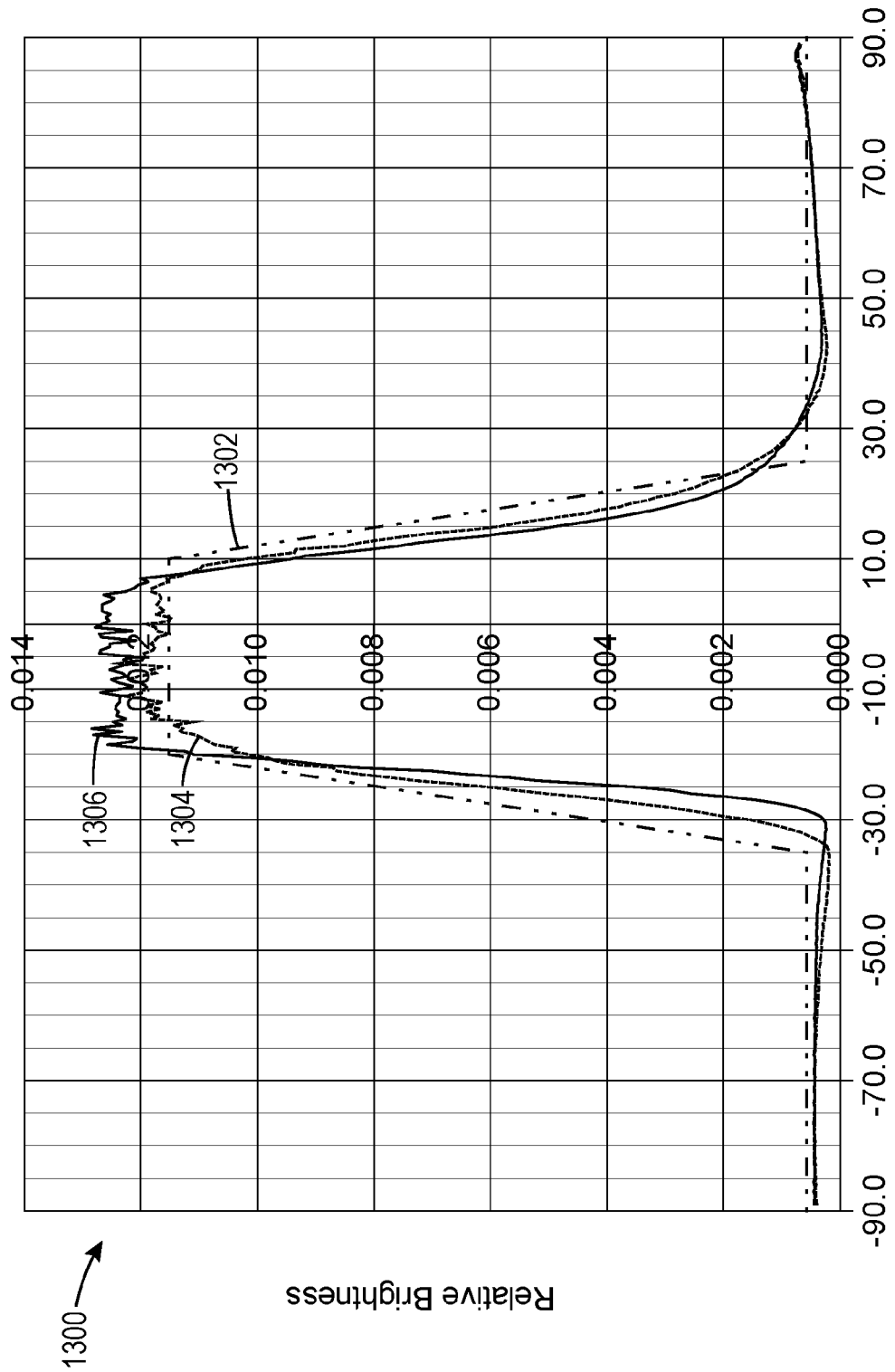
FIG. 13 is an example plot of down-guide angle versus relative brightness showing light output distributions of example ATFs, including ATFs with cubic facet prisms and ATFs with multi-radius facet prisms.

FIG. 13 is an example plot of down-guide angle versus relative brightness showing light output distributions of the example ATF prims 302 of FIG. 3 (i.e., a cubic equation based second surface segment) and 1200 of FIG. 12 (multi-radius facet based second surface segment) give light input distribution 602 of FIG. 6. As shown in the example of FIG. 13, a target top-hat distribution may be illustrated as target top-hat distribution 1302. As shown in FIG. 13, ATF prism 302 may produce a light distribution 1304 that may approximate a target top-hat distribution 1302 when using input distribution 602. As shown in FIG. 13, ATF prism 1200 may produce a light distribution 1306 that may approximate a target top-hat distribution 1302 when using input distribution 602. In this way, FIG. 13 shows that a multi-radius based second surface segment with discontinuous slopes at first and second transitions and sub-segments of the second surface segment may produce a top-hat light output distribution.

Figure 14:
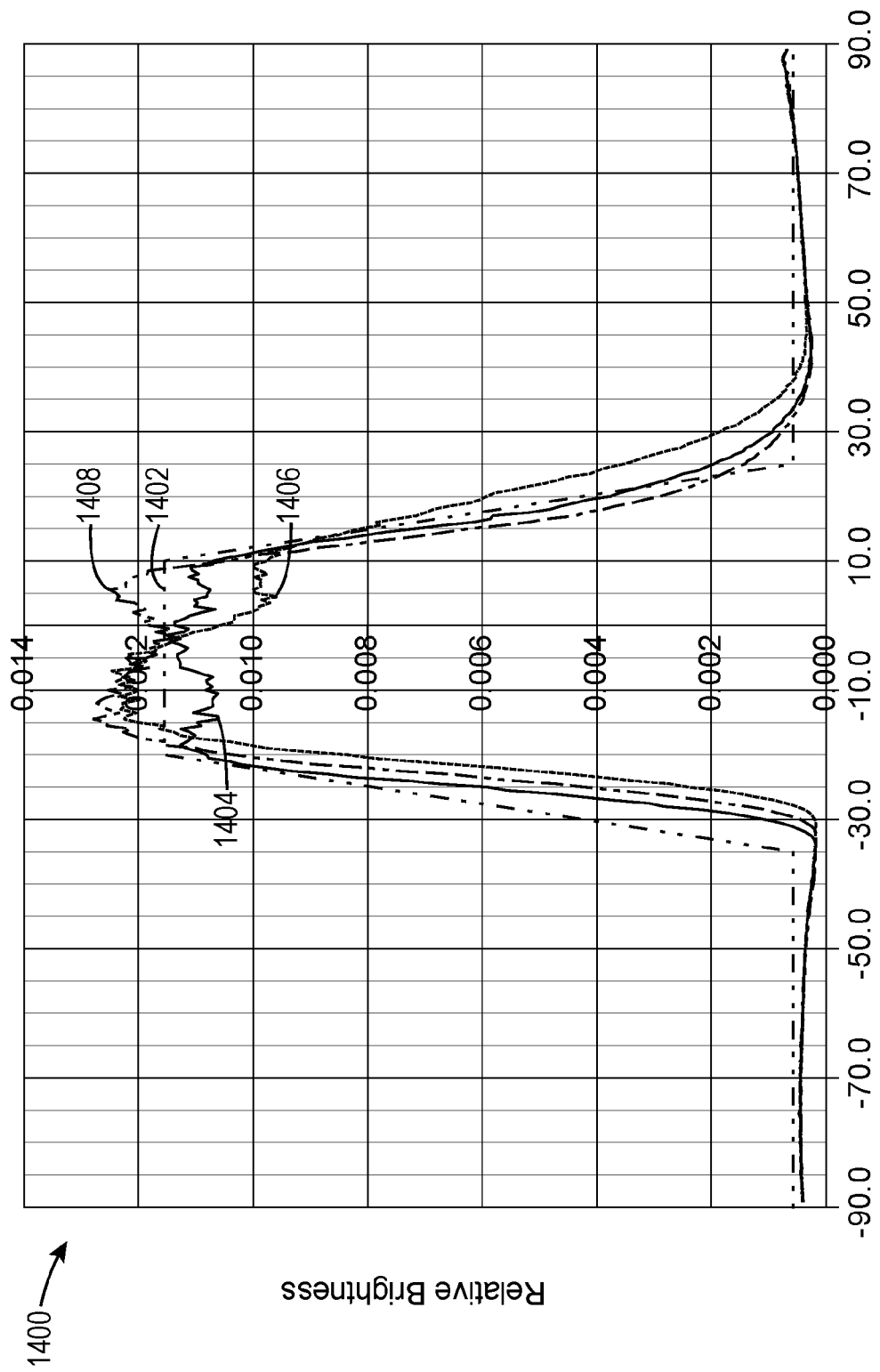
FIG. 14 is an example plot of down-guide angle versus relative brightness showing light output distributions of example ATFs, including a ATFs with single-radius facet prisms and ATFs with quadratic facet prisms.

FIG. 14 is an example plot of down-guide angle versus relative brightness showing light output distributions of example ATFs, including ATFs with single-radius turning fraction), the ratio of the third surface segment 206 to the second side 138 chord length (i.e., base linear fraction), the first angle 216 (i.e., tip angle), the second angle 218 (i.e., base angle), the second derivative ratio, and the like. Table 3 shows example ATF prism design parameters for ATF prisms 1502-1518 designed to meet target center angles (e.g., output distributions centered at −10 degrees, 0 degrees, or 10 degrees) and target widths (e.g., widths of approximately 25 degrees, 30 degrees, and 35 degrees). ATF prisms 1502-1518 of Table 3 correspond to output distributions 1502-1518 of FIGS. 15A-D.

TABLE 3

| ATF Prism | Target Width (degree) | Target Center (degree) | Injection Face Angle (degree) | Base Linear Fraction | Base Angle (degree) | Tip Linear Fraction | Tip Angle (degree) | 2nd Derivative Ratio | Pitch (mm) | Tilt (degree) |
|---|---|---|---|---|---|---|---|---|---|---|
| 1502 | 30 | 0 | 65.00 | 0.2386 | 63.49 | 0.0323 | 47.67 | 1.112 | 0.04440 | 0.00 |
| 1504 | 30 | −10 | 65.00 | 0.2360 | 66.1 | 0.0307 | 50.13 | 1.137 | 0.04440 | 0.00 |
| 1506 | 30 | 10 | 65.00 | 0.2793 | 58.56 | 0.0337 | 43.55 | 1.152 | 0.04440 | 0.00 |
| 1508 | 25 | 0 | 65.00 | 0.2437 | 62.42 | 0.0307 | 47.8 | 1.072 | 0.04440 | 0.00 |
| 1510 | 25 | −10 | 65.00 | 0.2395 | 65.35 | 0.0307 | 50.68 | 1.083 | 0.04440 | 0.00 |
| 1512 | 25 | 10 | 65.00 | 0.2744 | 58.45 | 0.0309 | 44.19 | 1.119 | 0.04440 | 0.00 |
| 1514 | 35 | 0 | 65.00 | 0.2299 | 64.14 | 0.0306 | 45.48 | 1.171 | 0.04440 | 0.00 |
| 1516 | 35 | −10 | 65.00 | 0.2298 | 66.73 | 0.0301 | 49.89 | 1.135 | 0.04440 | 0.00 |
| 1518 | 35 | 10 | 65.00 | 0.2764 | 58.85 | 0.0328 | 43.41 | 1.152 | 0.04440 | 0.00 | facet prisms and ATFs with quadratic facet prisms. In some examples, the top-hat distributions provided by ATFs including ATF prisms having cubic equation (or higher order equation) based facets may provide improved top-hat output distributions as compared to ATFs without cubic equation (or higher order equation) based facets. For example, output distribution 1404 may correspond to a radius shaped second surface segment with no first surface segment and a planar third surface segment, output distribution 1406 may correspond to a quadratic shaped second surface segment with no first surface segment and a planar third surface segment, and output distribution 1408 may correspond to a quadratic shaped second surface segment with a planar first surface segment and a planar third surface segment. In some examples, output distributions 1404, 1406, and 1408 may not match target distribution 1402. In some examples, output distributions 1404, 1406, and 1408 may not be substantially similar to target distribution 1402. In some examples, output distributions 1404, 1406, and 1408 may not resemble target distribution 1402. In some examples, output distributions 1404, 1406, and 1408 may have top-hat distributions, i.e., a flat-top portion with substantially a zero or positive dome shape with deviations from this positive dome shape less than about 3% or less than about 2%, or less than about 1%, and a distribution that may be at least about 20 degrees wide, or at least about 25 degrees wide, or at least about 30 degrees wide when measured by the 90% brightness points and falls to less than 5% of a maximum luminance at least on one side of the output distribution over an angular range that is less than about 15 degrees, or less than about 7 degrees.

Figure 15A:
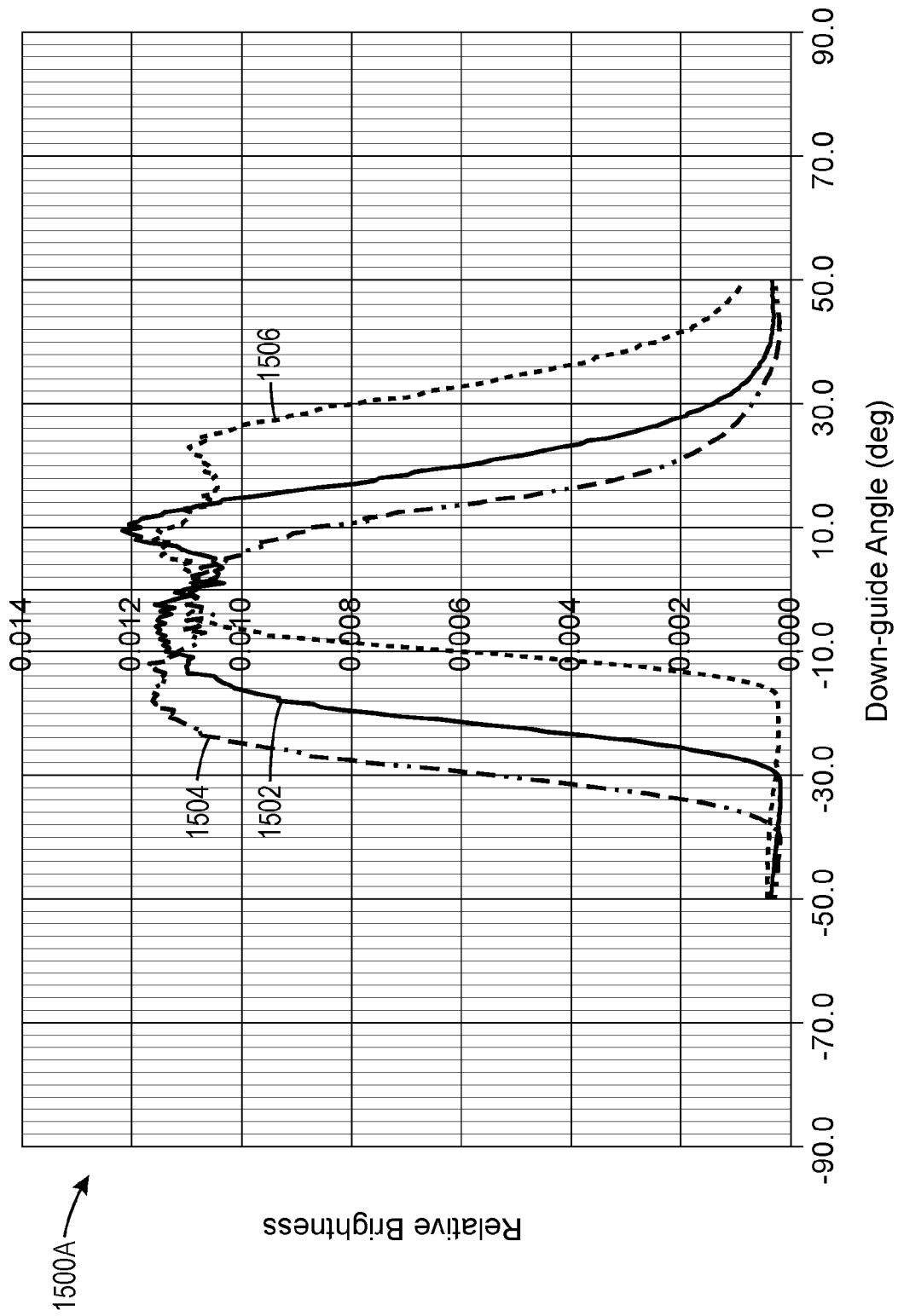
FIG. 15A-15D are example plots of down-guide angle versus relative brightness showing output distributions of example ATFs including cubic facet prisms designed for various output distribution widths and angles.
Figure 15B:
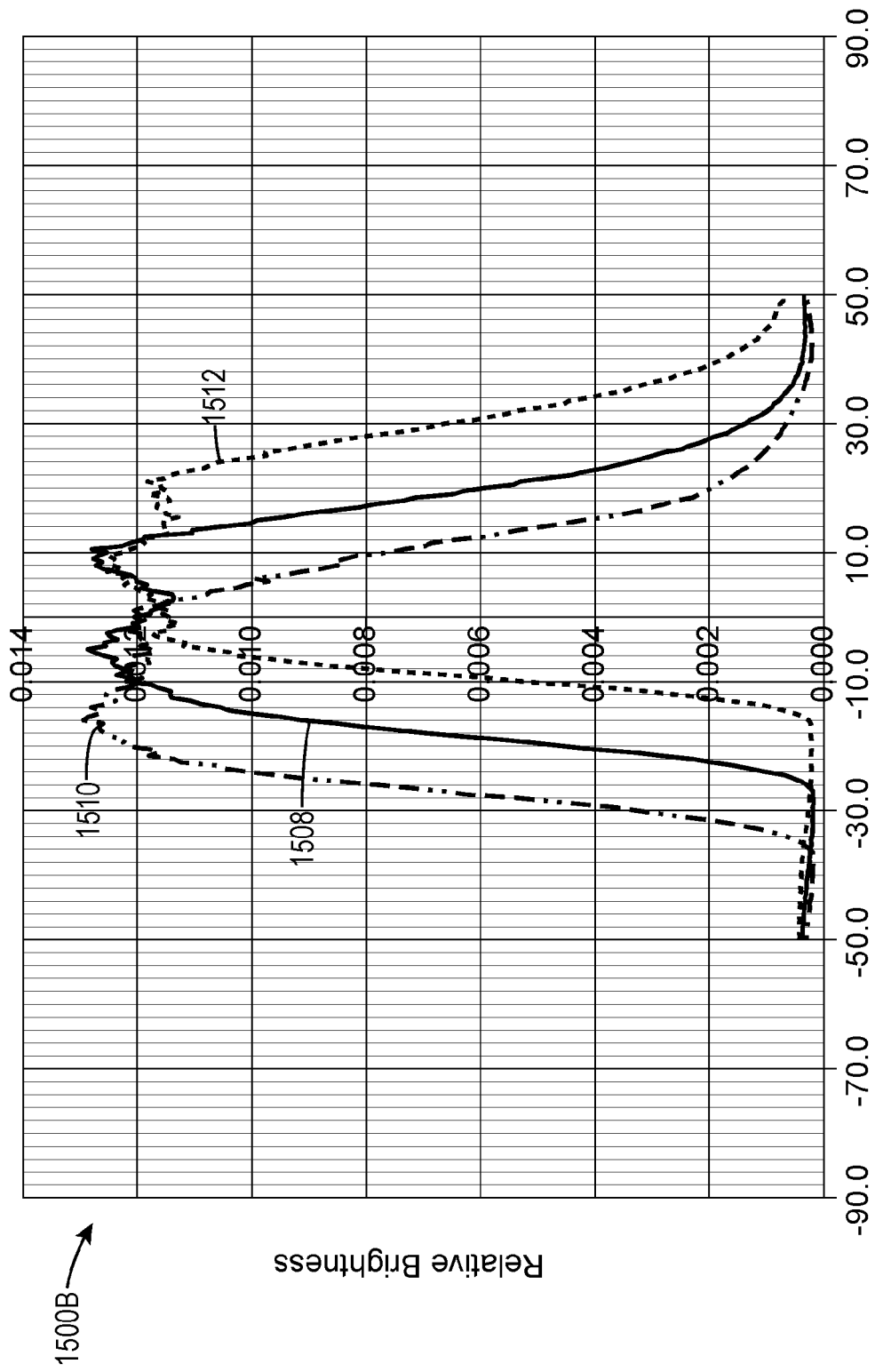
Figure 15C:
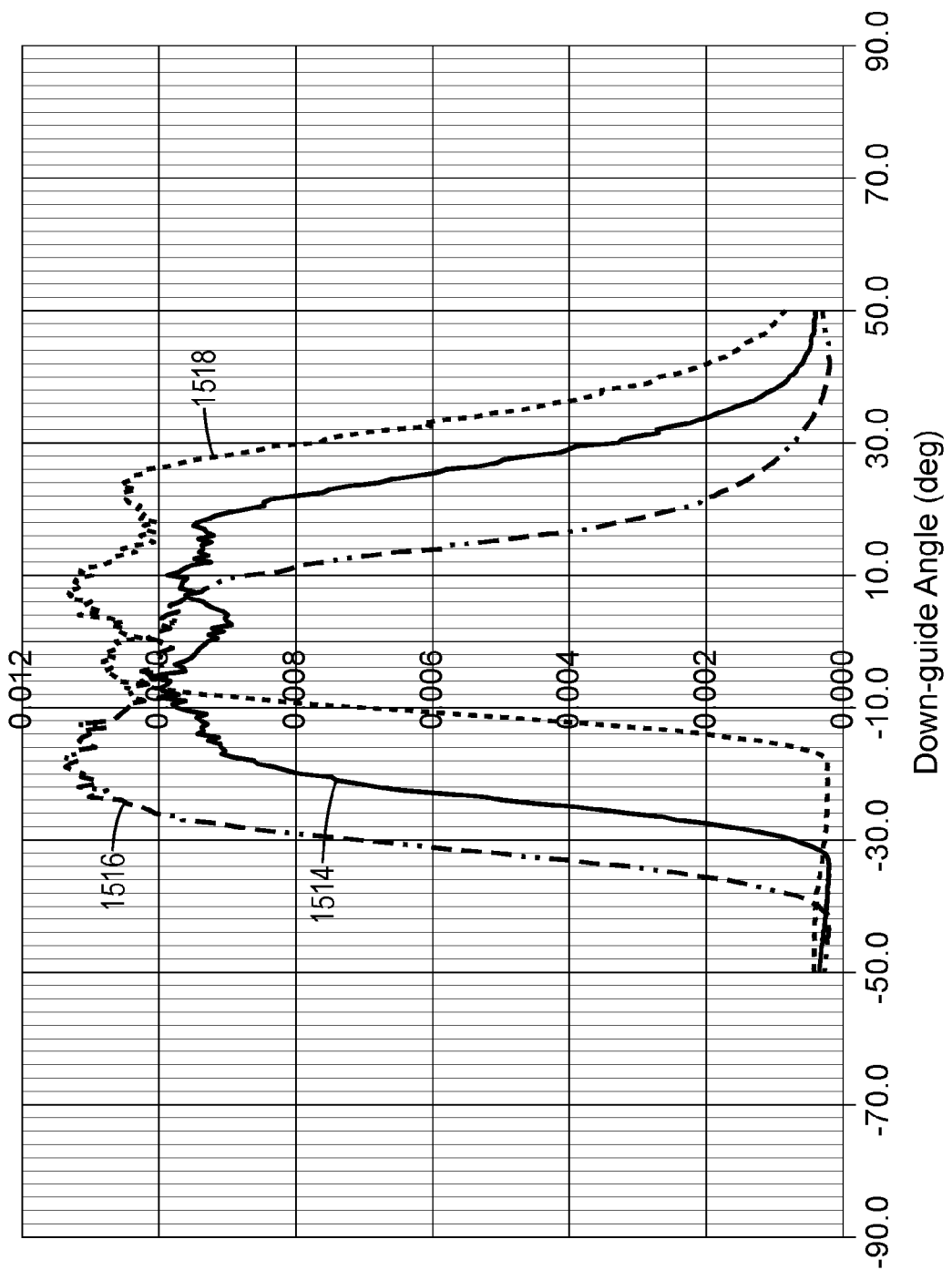

FIGS. 15A-B are example plots of down-guide angle versus relative brightness showing light output distributions of example ATFs including cubic face prisms designed for various output distribution widths and angles. In some examples, ATF prism design parameters may be tuned to produce an output distribution centered on or near a target center angle with target widths (e.g., target cut-off angles). In some examples, tunable ATF design parameters may include, for example, the ratio of the first surface segment 202 to the second side 138 chord length (i.e., tip linear In some examples, ATF prism design parameters may be tuned to change the target center angle. For example, plot 1500A of FIG. 15A shows output distributions corresponding to ATF prisms 1502, 1504, 1506. As shown in FIG. 15A, ATF prism 1502 is centered on 0 degrees (i.e., on the y-axis), ATF prism 1504 is centered on −10 degrees, and ATF prism 1506 is centered on 10 degrees. As another example, plot 1500B of FIG. 15B shows output distributions corresponding to ATF prisms 1508, 1510, 1512. As shown in FIG. 15B, ATF prism 1508 is centered on 0 degrees (y-axis), ATF prism 1510 is centered on −10 degrees, and ATF prism 1512 is centered on 10 degrees. For example, plot 1500C of FIG. 15C shows output distributions corresponding to ATF prisms 1514, 1516, 1518. As shown in FIG. 15C, ATF prism 1514 is centered on 0 degrees (y-axis), ATF prism 1516 is centered on −10 degrees, and ATF prism 1518 is centered on 10 degrees. In this way, it is possible to tune ATF prism design parameters of ATFs disclosed herein to center output distributions on a target center angle.

Figure 15D:
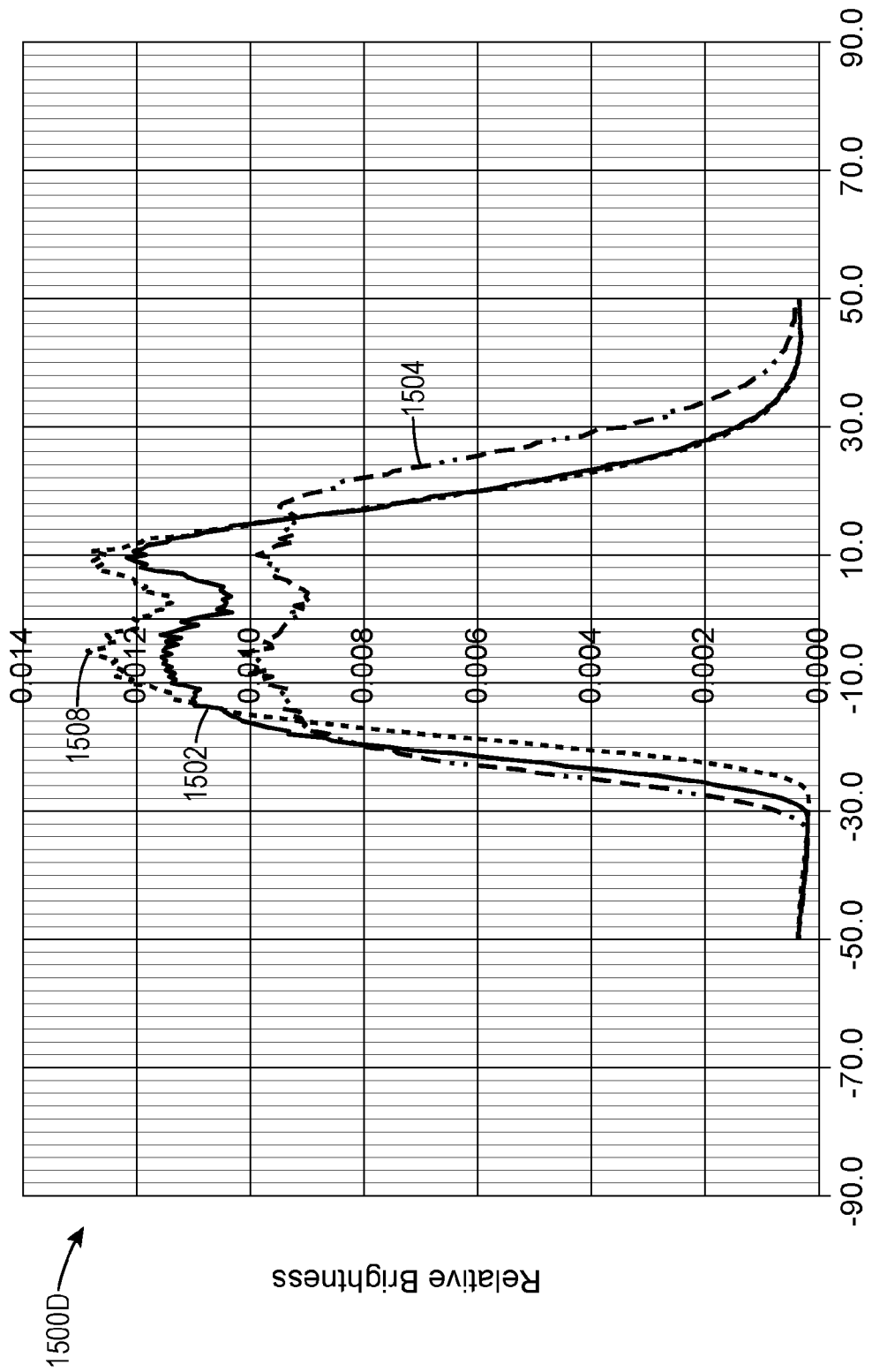

In some examples, ATF prism design parameters may be tuned to change the target width of the output distribution. For example, plot 1500D of FIG. 15D shows output distributions corresponding to ATF prisms 1502, 1508, 1514. As shown in FIG. 15D, ATF prism 1502 has a width of about 30 degrees, ATF prism 1508 has a width of about 25 degrees, and ATF prism 1514 has a width of about 35 degrees. In this way, it is possible to tune ATF prism design parameters of ATFs disclosed herein to produce output distributions with or near a target output distribution width.

Figure 16A:
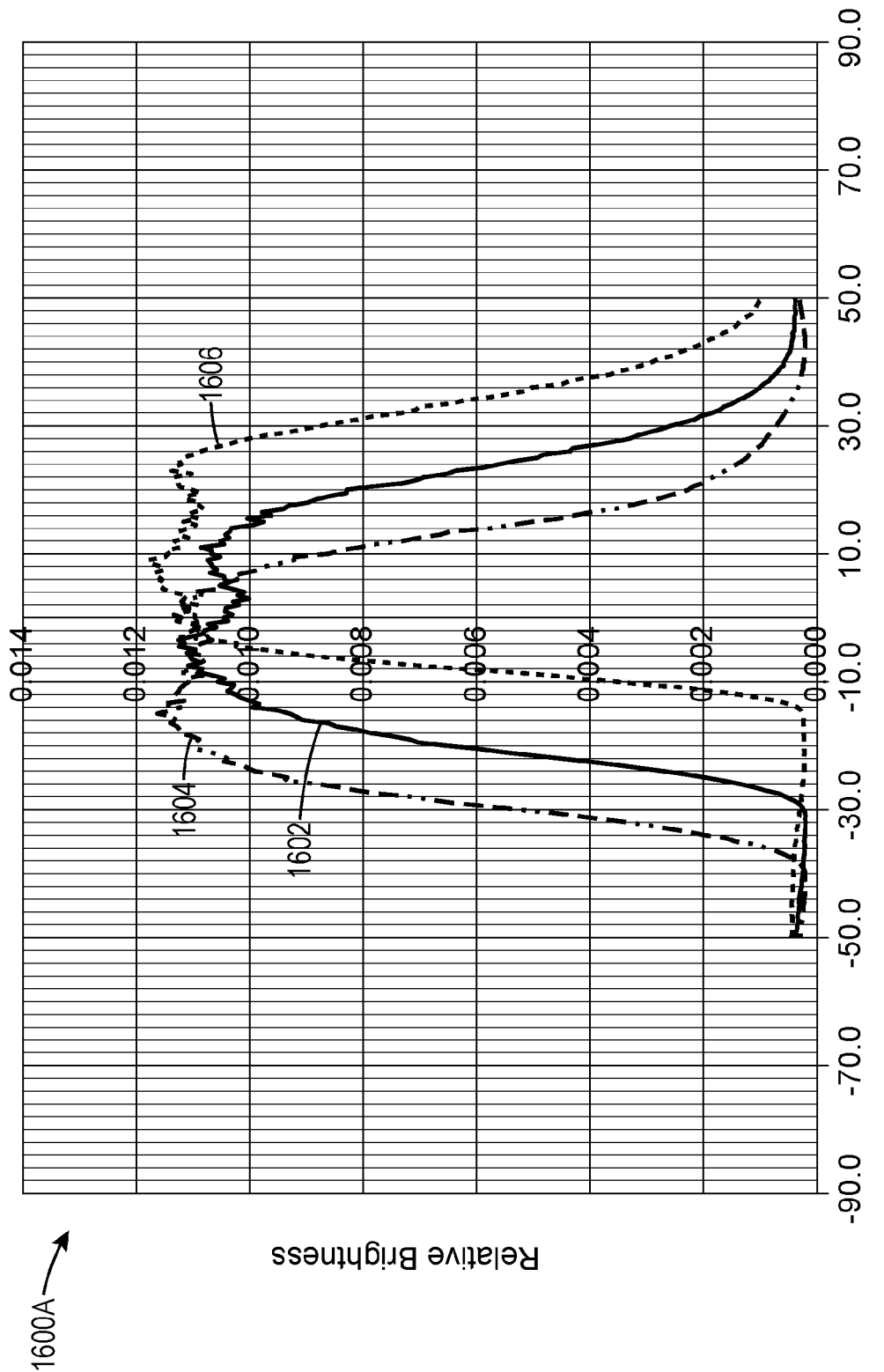
FIG. 16A-16D are example plots of down-guide angle versus relative brightness showing output distributions of example ATFs including cubic facet prisms designed for various output distribution widths and angles.
Figure 16B:
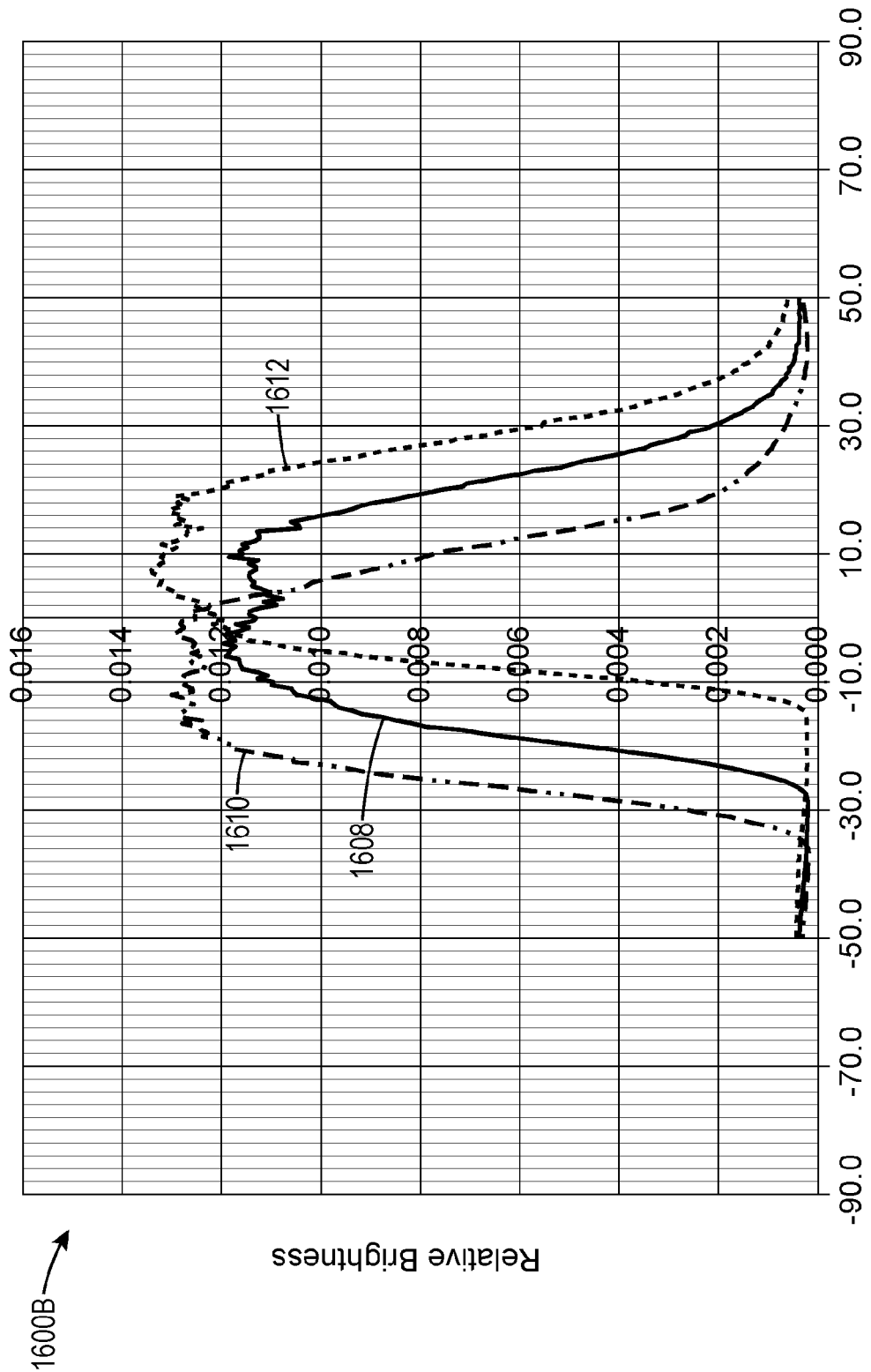

FIGS. 16A-B are example plots of down-guide angle versus relative brightness showing light output distributions of example ATFs including cubic face prisms designed for various output distribution widths and angles. The example of FIGS. 16A-16D use the same tunable ATF design parameters as describe above with respect to FIGS. 15A-15D. Table 4 shows example ATF prism design parameters for ATF prisms 1602-1618 designed to meet target center angles (e.g., output distributions centered at −10 degrees, 0 degrees, or 10 degrees) and target widths (e.g., widths of approximately 25 degrees, 30 degrees, and 35 degrees). ATF prisms 1602-1618 of Table 4 correspond to output distributions 1602-1618 of FIGS. 16A-D.

of a ATF prism to predict the cut-off angles of an output distribution (i.e., the edges of the top-hat distribution) of the ATF.

TABLE 4

| ATF Prism | Target Width (degree) | Target Center (degree) | Injection Face Angle (degree) | Base Linear Fraction | Base Angle (degree) | Tip Linear Fraction | Tip Angle (degree) | 2nd Derivative Ratio | Pitch (mm) | Tilt (degree) |
|---|---|---|---|---|---|---|---|---|---|---|
| 1602 | 30 | 0 | 65.00 | 0.2050 | 63.98 | 0.0257 | 46.11 | 1.102 | 0.04440 | 0.00 |
| 1604 | 30 | −10 | 65.00 | 0.2360 | 66.1 | 0.0307 | 50.13 | 1.194 | 0.04440 | 0.00 |
| 1606 | 30 | 10 | 65.00 | 0.2847 | 57.75 | 0.0340 | 43.3 | 1.180 | 0.04440 | 0.00 |
| 1608 | 25 | 0 | 65.00 | 0.2049 | 63.39 | 0.0253 | 46.58 | 1.079 | 0.04440 | 0.00 |
| 1610 | 25 | −10 | 65.00 | 0.2382 | 65.21 | 0.0304 | 50.81 | 1.126 | 0.04440 | 0.00 |
| 1612 | 25 | 10 | 65.00 | 0.2773 | 57.98 | 0.0308 | 44.78 | 1.118 | 0.04440 | 0.00 |
| 1614 | 35 | 0 | 65.00 | 0.2039 | 64.92 | 0.0253 | 45.35 | 1.174 | 0.04440 | 0.00 |
| 1616 | 35 | −10 | 65.00 | 0.2287 | 66.66 | 0.0306 | 50.29 | 1.188 | 0.04440 | 0.00 |
| 1618 | 35 | 10 | 65.00 | 0.2815 | 58.55 | 0.0329 | 43.57 | 1.193 | 0.04440 | 0.00 |

Figure 16C:
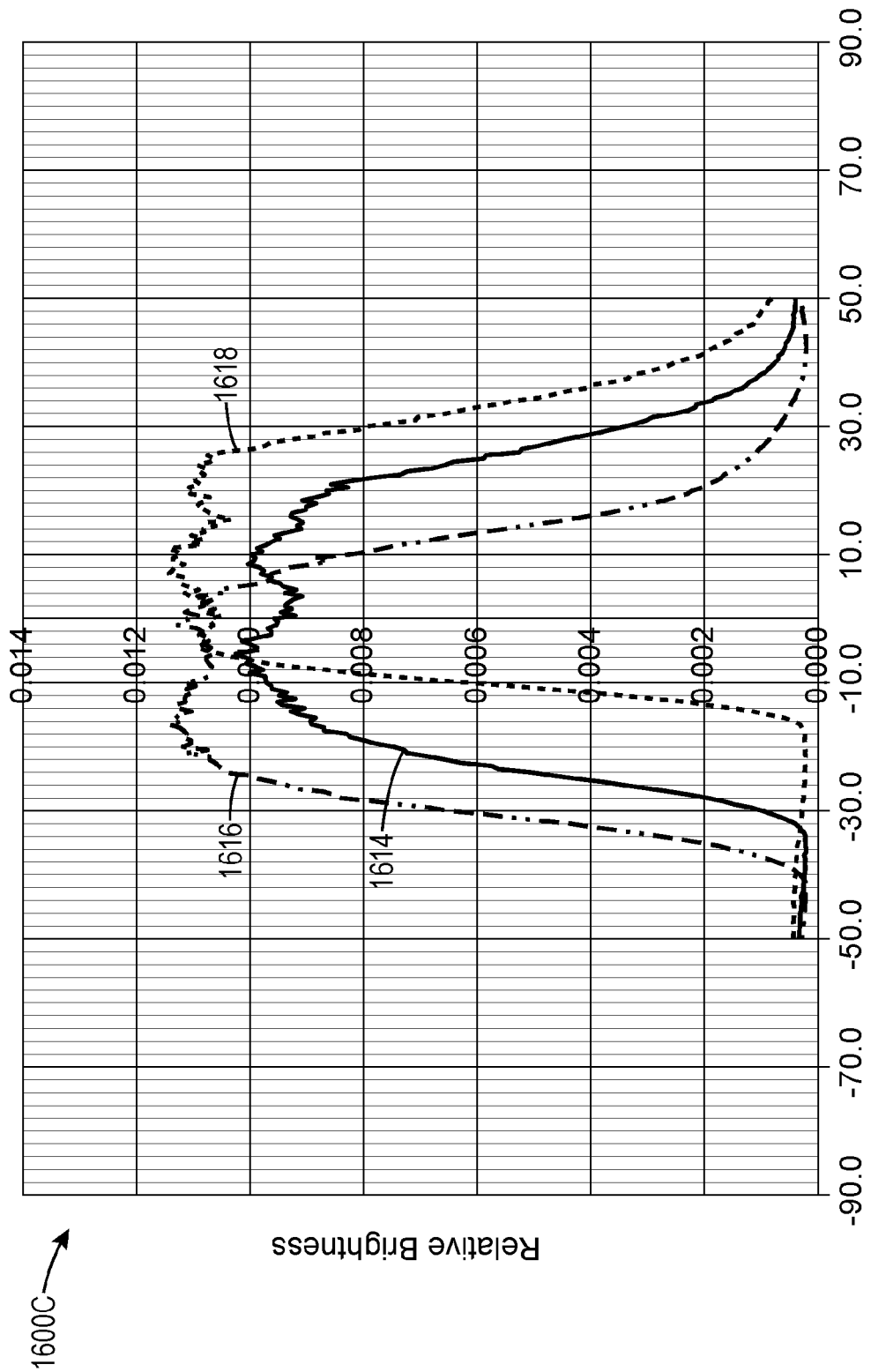

In some examples, ATF prism design parameters may be tuned to change the target center angle. For example, plot 1600A of FIG. 16A shows output distributions corresponding to ATF prisms 1602, 1604, 1606. As shown in FIG. 16A, ATF prism 1602 is centered on 0 degrees (i.e., on the y-axis), ATF prism 1604 is centered on −10 degrees, and ATF prism 1606 is centered on 10 degrees. As another example, plot 1600B of FIG. 16B shows output distributions corresponding to ATF prisms 1608, 1610, 1612. As shown in FIG. 16B, ATF prism 1608 is centered on 0 degrees (y-axis), ATF prism 1610 is centered on −10 degrees, and ATF prism 1612 is centered on 10 degrees. For example, plot 1600C of FIG. 16C shows output distributions corresponding to ATF prisms 1614, 1616, 1618. As shown in FIG. 16C, ATF prism 1614 is centered on 0 degrees (y-axis), ATF prism 1616 is centered on −10 degrees, and ATF prism 1618 is centered on 10 degrees. In this way, it is possible to tune ATF prism design parameters of ATFs disclosed herein to center output distributions on a target center angle.

Figure 16D:
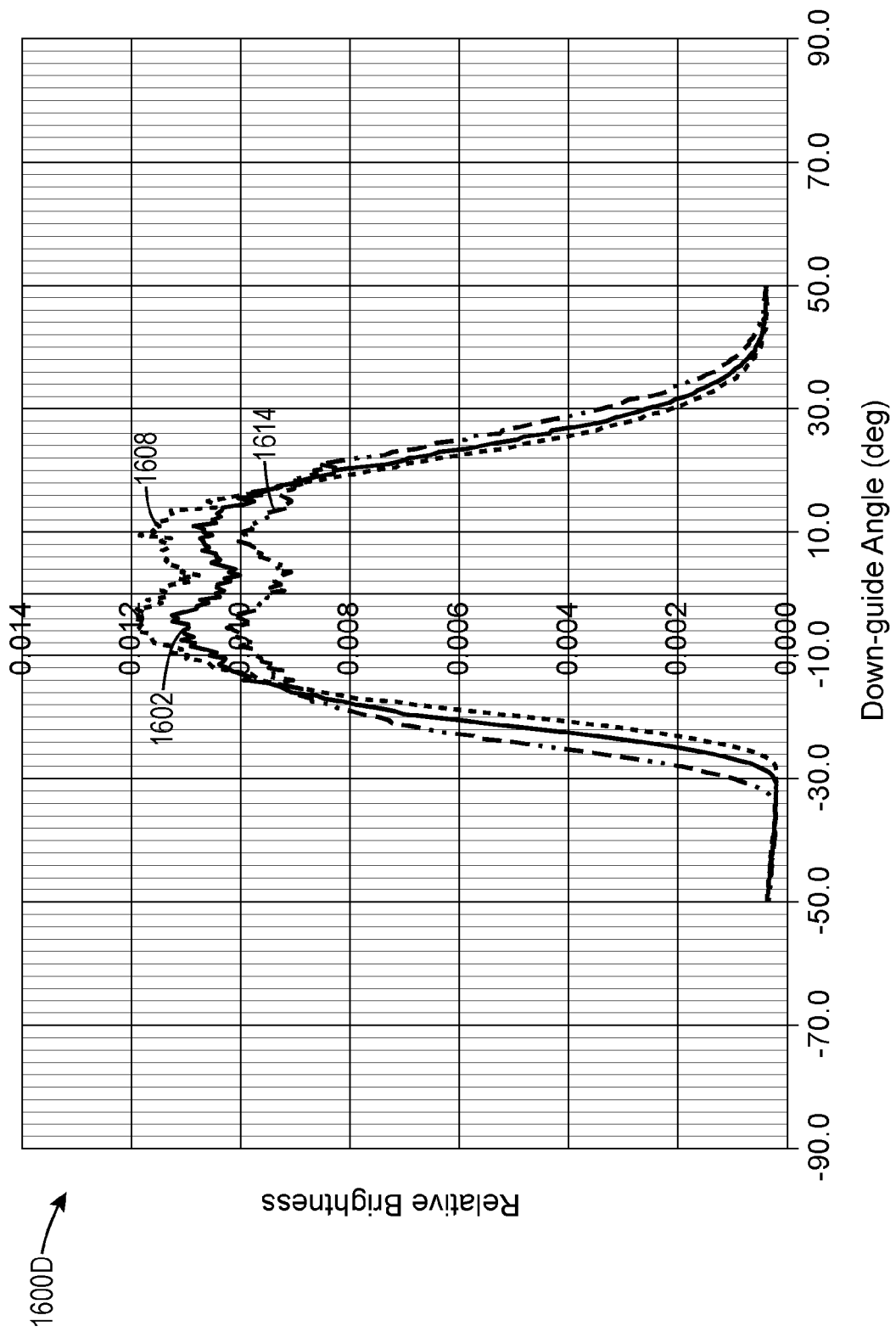

In some examples, ATF prism design parameters may be tuned to change the target width of the output distribution. For example, plot 1600D of FIG. 16D shows output distributions corresponding to ATF prisms 1602, 1608, 1614. As shown in FIG. 16D, ATF prism 1602 has a width of about 30 degrees, ATF prism 1608 has a width of about 25 degrees, and ATF prism 1614 has a width of about 35 degrees. In this way, it is possible to tune ATF prism design parameters of ATFs disclosed herein to produce output distributions with or near a target output distribution width.

In some examples, ATF prism design parameters may be tuned based on predicted output ray angles for one or more ATF prism surface segments. For example, an output ray angle for an ATF prism surface segment may be given by $$\beta = 90 + \arcsin(n \times \sin[\Theta_2 - (\Theta_a - \arcsin((1/n) \times \sin(90 - \Theta_i)))])$$ (Equation 3)

where $\beta$ is the output ray angle relative to the display axis (i.e., the first major surface normal), $n$ is the ATF prism refractive index, $\Theta_2$ is the angle of the surface segment (e.g., first angle, second angle, or the like), $\Theta_a$ is the prism apex angle (i.e., angle between the first side and second side), $\Theta_i$ is the injection angle 214 (i.e., entrance window face angle), and a is the angle of the light ray incident on the first side of the ATF prism relative to the surface of the first side. In some examples, Equation 3 may be used to predict an output ray of the first surface segment and the third surface segment In some examples, ATF prism design parameters may be tuned to meet design criterion, standards, or specifications. For example, ATF prism design parameters may be tuned to meet European Union Original Equipment Manufacturer standards, e.g., Display Specifications for Automotive Application V4.5.2, or the like. For example, ATF prism design parameters may be tuned to provide an output distribution with at least about 60 percent of light originating from the light guide (i.e., the backlight total output through the turning film and before the display polarizer) and existing through the ATF is included in +20 degrees and −10 degrees centered on the display axis, or an output distribution with at least about 60 percent of light originating from the light guide and existing through the ATF is included in +8 degrees and −4 degrees centered on the display axis, or the like.

What is claimed is:

1. An optical system, comprising:
   a light guide; and
   a turning film, comprising:
      a first major surface, wherein the first major surface is substantially smooth; and
      a second major surface comprising a plurality of asymmetric microstructures each respective asymmetric microstructure, comprising:
         a first side, wherein the first side is substantially planar; and
         a second side, comprising:
            a first surface segment defining a substantially planar surface; and
            a second surface segment defining a non-planar surface,
      wherein a full width at 90% maximum relative brightness is at least 35% as wide as a full width at 20% maximum relative brightness,
      wherein an output distribution of relative brightness to down-guide angle includes a flat-top region between −15 and 5 degrees having less than 5% peak to valley variability of the output distribution.

2. The optical system of claim 1, wherein the first surface segment extends from a vertex at the intersection of the first side and the second side to a first transition point, wherein the second surface segment extends from the first transition point towards a valley between the respective asymmetric microstructure and an adjacent asymmetric microstructure, wherein the full width at 90% maximum relative brightness is at least 40% as wide as the full width at 20% maximum relative brightness, wherein an output distribution of relative brightness to down-guide angle includes a flat-top region between −20 and 10 degrees having less than 5% peak to valley variability of the output distribution.

3. The optical system of claim 1, wherein the first surface segment extends from a valley between the respective asymmetric microstructure and an adjacent asymmetric microstructure to a first transition point, wherein the second surface segment extends from the first transition point towards a vertex at the intersection of the first side and the second side, wherein the full width at 90% maximum relative brightness is at least 45% as wide as the full width at 20% maximum relative brightness.

4. The optical system of claim 1, wherein each of the plurality of asymmetric microstructures are substantially the same lateral cross-sectional shape.

5. The optical system of claim 1, wherein the first major surface defines a reference plane substantially parallel to the first major surface, wherein a first angle of the first surface segment is between about 40 degrees and about 70 degrees relative to the reference plane.

6. The optical system of claim 1, wherein the shape of the second surface segment is based on a cubic equation.

7. The optical system of claim 1, wherein at least about 60 percent of light originating from the light guide and exiting through the first major surface is included in a first set of characteristic viewing angles, wherein the first major surface defines a center viewing angle normal to the first major surface.

8. The optical system of claim 1, wherein at least 60 percent of light originating from the light guide and exiting through the first major surface is included in a first set of characteristic viewing angles, wherein the first major surface defines a center viewing angle normal to the first major surface, wherein the first set of characteristic viewing angles is between about −20 degrees and about 20 degrees relative to the center viewing angle.

9. The optical system of claim 1, the second side further comprising a third surface segment defining a substantially planar surface.

10. The optical system of claim 2, wherein the second surface segment is substantially convex.

11. The optical system of claim 2, wherein a distance between the vertex and the first transition point is between about 3 percent to about 15 percent of a distance between the vertex and the valley of the respective asymmetric microstructure.

12. The optical system of claim 2, wherein a distance between the first transition point and the valley is between about 85 percent to about 97 percent of a distance between the vertex and the valley of the respective asymmetric microstructure.

13. The optical system of claim 11, wherein the second surface segment is substantially concave.

14. The optical system of claim 3, wherein a distance between the valley and the first transition point is between about 3 percent to about 50 percent of a distance between the vertex and the valley of the respective asymmetric microstructure.

15. The optical system of claim 3, wherein a distance between the first transition point and the vertex is between about 50 percent to about 90 percent of a distance between the vertex and the valley of the respective asymmetric microstructure.

16. The optical system of claim 5, wherein the shape of the first surface segment is based on a first linear equation, wherein the shape of the second surface segment is based on a cubic equation, wherein a first derivative of the cubic equation matches the first linear equation.

17. The optical system of claim 5, wherein the first angle is based on a first linear equation, wherein the shape of the second surface segment is based on a fourth or higher order equation, wherein a first derivative of the fourth or higher order equation matches the first linear equation.

18. The optical system of claim 7, wherein the first set of characteristic viewing angles is between about −35 degrees and about 35 degrees relative to the center viewing angle.

19. The optical system of claim 9, wherein a second angle of the third surface segment is between about 40 degrees and about 70 degrees relative to a reference plane substantially parallel to the first major surface.

20. The optical system of claim 9, wherein at least 60 percent of light originating from the light guide and exiting through the first major surface is included in a first set of characteristic viewing angles, wherein the first major surface defines a center viewing angle normal to the first major surface.

21. The optical system of claim 9, wherein at least 60 percent of light originating from the light guide and exiting through the first major surface is included in a first set of characteristic viewing angles, wherein the first major surface defines a center viewing angle normal to the first major surface, wherein the first set of characteristic viewing angles is between about −20 degrees and about 20 degrees relative to the center viewing angle.

22. The optical system of claim 19, wherein the light guide inputs light into the turning film at a light input distribution, wherein the first angle, the cubic equation, and the second angle are based on the light input distribution.

23. The optical system of claim 20, wherein the first set of characteristic viewing angles is between about −35 degrees and about 35 degrees relative to the center viewing angle relative to the center viewing angle.

* * * * *

UNITED STATES PATENT AND TRADEMARK OFFICE
CERTIFICATE OF CORRECTION

| | | |
|---|---|---|
| PATENT NO. | : 11,307,333 B2 | Page 1 of 1 |
| APPLICATION NO. | : 16/475186 | |
| DATED | : April 19, 2022 | |
| INVENTOR(S) | : Robert Milton Emmons | |

It is certified that error appears in the above-identified patent and that said Letters Patent is hereby corrected as shown below:

In the Claims

Column 24
Line 49-50 (approx.), In Claim 23, delete "relative to the center viewing angle relative to the center viewing angle", and insert -- relative to the center viewing angle --, therefor.

Signed and Sealed this
Fifteenth Day of November, 2022

Katherine Kelly Vidal
*Director of the United States Patent and Trademark Office*